US009426513B2

United States Patent
Jang et al.

(10) Patent No.: US 9,426,513 B2
(45) Date of Patent: *Aug. 23, 2016

(54) METHOD FOR PROVIDING MENU FOR NETWORK TELEVISION

(75) Inventors: Sae Hun Jang, Seoul (KR); Uni Young Kim, Seoul (KR); Sang Jun Koo, Seoul (KR); Kyung Hee Yoo, Seoul (KR); Hyung Nam Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

This patent is subject to a terminal disclaimer.

(21) Appl. No.: 12/764,718

(22) Filed: Apr. 21, 2010

(65) Prior Publication Data

US 2011/0119710 A1    May 19, 2011

(30) Foreign Application Priority Data

Nov. 17, 2009  (KR) .......................... 10-2009-0110823

(51) Int. Cl.
- H04N 5/445      (2011.01)
- H04N 21/431     (2011.01)
- H04N 21/43      (2011.01)
- H04N 1/00       (2006.01)

(52) U.S. Cl.
CPC ....... *H04N 21/4312* (2013.01); *H04N 1/00424* (2013.01); *H04N 21/4307* (2013.01)
USPC .................. 725/41; 725/32; 725/37; 725/38; 725/40; 725/42

(58) Field of Classification Search
CPC ..................... H04N 21/4307; H04N 1/00424
USPC .............................. 725/32, 37, 38, 40, 41, 42
See application file for complete search history.

(56) References Cited

U.S. PATENT DOCUMENTS

| 5,524,195 | A  | 6/1996  | Clanton, III et al. |
| 5,745,710 | A  | 4/1998  | Clanton, III et al. |
| 6,828,993 | B1 | 12/2004 | Hendricks et al. ............ 345/819 |
| 7,706,740 | B2 | 4/2010  | Collins et al. |
| 7,752,642 | B2 * | 7/2010 | Lemmons ...................... 725/32 |

(Continued)

FOREIGN PATENT DOCUMENTS

| EP | 0 670 652       | 9/1995 |
| EP | 0670652 A1 *    | 9/1995 |

(Continued)

OTHER PUBLICATIONS

Chinese Office Action issued in related Application No. 201080052139.0 dated Jun. 4, 2014.

(Continued)

*Primary Examiner* — Pankaj Kumar
*Assistant Examiner* — Sahar Baig
(74) *Attorney, Agent, or Firm* — KED & Associates, LLP

(57) ABSTRACT

An information manager includes a network interface, a user interface, and a controller. The network interface establishes a connection with at least one content provider server through a network. The user interface receives an input signal selecting an icon for display. The controller controls output of the selected icon for display along with an image corresponding to the selected icon. The selected icon corresponds to the content provider and is displayed with one or more other icons that correspond to additional content providers, and the image is based on information received through the network interface from the content provider.

20 Claims, 35 Drawing Sheets

(56) References Cited

U.S. PATENT DOCUMENTS

| | | | |
|---|---|---|---|
| 8,127,239 B2* | 2/2012 | Louch et al. | 715/764 |
| 2003/0033157 A1* | 2/2003 | Dempski et al. | 705/1 |
| 2006/0202978 A1* | 9/2006 | Lee et al. | 345/204 |
| 2006/0209018 A1* | 9/2006 | Watanabe et al. | 345/156 |
| 2007/0011702 A1* | 1/2007 | Vaysman | 725/45 |
| 2008/0063357 A1* | 3/2008 | Kunieda et al. | 386/52 |
| 2008/0090513 A1 | 4/2008 | Collins et al. | |
| 2008/0092173 A1 | 4/2008 | Shannon et al. | 725/47 |
| 2008/0215999 A1* | 9/2008 | Kim et al. | 715/762 |
| 2009/0013350 A1* | 1/2009 | Ohlfs et al. | 725/39 |
| 2010/0011300 A1* | 1/2010 | AlHusseini et al. | 715/747 |
| 2010/0092107 A1* | 4/2010 | Mochizuki et al. | 382/309 |

FOREIGN PATENT DOCUMENTS

| | | |
|---|---|---|
| JP | 08-101756 | 4/1996 |
| JP | 2009-239933 | 10/2009 |
| KR | 10-2008-0083704 | 9/2008 |
| KR | 1020080073403 | 11/2008 |
| KR | 1020080114521 | 12/2008 |
| KR | 1020090108500 | 10/2009 |
| WO | WO 03/026275 | 3/2003 |

OTHER PUBLICATIONS

European Search Report issued in related Application No. 10831695.1 dated May 14, 2014.

Korean Office Action dated Oct. 12, 2015 issued in Application No. 10-2009-0110823.

The Wizard: "Samsung G600 review: 5 MP Elegant Slider—Display, user interface and operation—MobileWitch.com"; Feb. 17, 2008; XP055238915; Retrieved from the Internet: URL: http://www.mobilewitch.com/Samsung-G600-review-5-MP-Elegant-Slider_review_details_9_page_2.thm (retrieved on Jan. 6, 2016).

European Summons to Attend Oral Proceedings Pursuant to Rule 115(1) EPC dated Mar. 29, 2016 issued in Application No. 10831695.1.

* cited by examiner

METHOD FOR PROVIDING MENU FOR NETWORK TELEVISION

CROSS-REFERENCE TO RELATED APPLICATIONS

The present application claims the benefit of priority under 35 U.S.C. 119 to Korean Patent Application No. 10-2009-0110823 filed on Nov. 17, 2009 which is hereby incorporated by reference in its entirety.

BACKGROUND

1. Field

Embodiments disclosed herein relate to display of media information.

2. Background

As digital technology develops, the concept of providing internet content on various types of display devices has garnered a lot of attention. One proposed technology is Internet Protocol TV (IPTV), which seeks to transmit video, audio, and other forms of digital content to televisions through a high-speed internet connection.

Other forms of technology include broadband TV and web TV. Unlike IPTV, broadband and web TV provide media information (e.g., VOD, game, visual telephone services, etc.) from several content providers. However, the aforementioned technologies as presently constituted have failed to optimize delivery of content to television users, nor do they offer users with creative ways of controlling and navigating through the selection, viewing, and previewing of internet content and of reviewing advertisement information.

DETAILED DESCRIPTION

Figure 1:
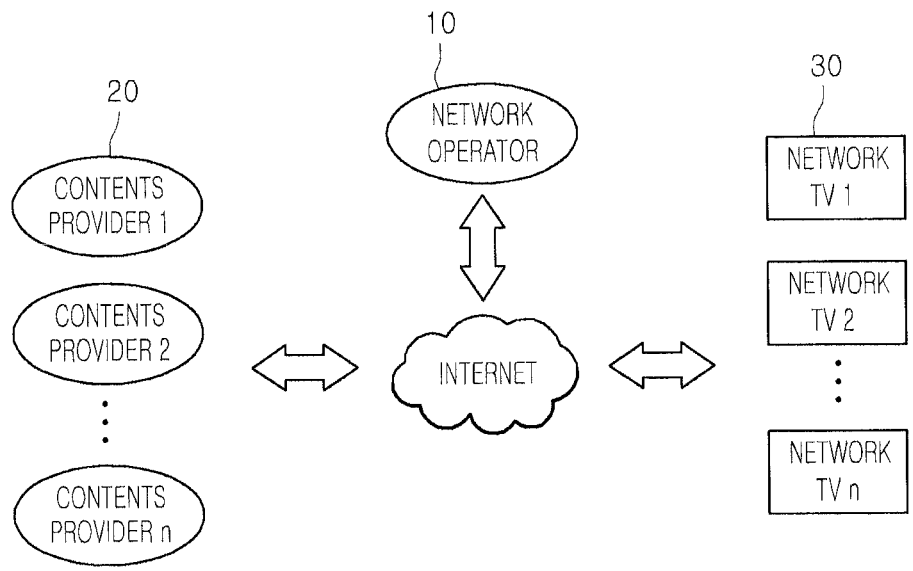
FIG. 1 is a diagram showing one embodiment of a network TV system.

FIG. 1 shows one embodiment of a network TV system which includes a network operator 10, at least one content provider (CP) 20, and at least one network TV 30, which are connected by a network, for example, the internet.

The network operator 10 provides base software, firmware, middleware, and/or other software routines for controlling output of content provided by the content provider in the network TV, as well as software for use in operation of the network TV. Further, the content provider is provided with hardware information of the network TV which is used for normal execution of content in the network TV.

For example, the network operator may provide a basic screen frame for providing content provided by the content provider to the network TV, and provides a user interface for allowing for a user to select content, inputting various commands, or displaying a corresponding output. Further, the network operator also provides data for updating firmware or software of the network TV. The network operator may be the same as the manufacturer of the network TV.

The content provider 20 generates various contents that may be provided on the network, forms them in a format that can be played in the network TV, and then provides the content in accordance with a request of the network TV. The content may be any multimedia content that can be serviced through the network.

According to one embodiment, the content provided by the content provider 20 may be directly provided to the network TV through the internet by the content provider or may be provided to the network TV via the network operator.

The network TV may be provided with exclusive firmware for displaying playing contents, searching, and displaying a list for each content provider. The firmware may be installed in the network TV during manufacture of the network TV, or downloaded from the content provider or the network operator and then installed when being used by a user.

The firmware of the network TV may be considered as a program for playing or executing the contents provided by the content provider. The firmware can be changed in accordance with the types of contents provided by the content provider. For example, when the content provider is a VOD provider, the firmware may include a VOD play program. When the content provider is an AOD or MOD provider, the firmware may include an AOD or MOD play program. When the content provider is a visual telephone provider, the firmware may include a visual telephone program.

The network TV receives content from the content provider and plays or executes the content. The network TV may include a TV equipped with a network module, a broadcast receiver such as a set top box, or any other type of display device equipped with a network module, such as a telephone for network. Although a broadcast receiver having a function of receiving broadcast is exemplified herein, embodiments disclosed herein may be applied to any display devices that can connect to a network.

According to one embodiment, the content provider may be a provider who makes or distributes a variety of content that will be provided to the network TV. The content provider may, for example, include a TV broadcasting station, a radio station, a VOD provider, an AOD provider, a game provider, a visual telephone provider, a weather information provider, and/or a photograph-related service provider or other media content provider.

The TV broadcasting station may be a terrestrial or cable broadcasting station which can produce and store programs that users can watch and convert them into a digital format for transmission. The radio broadcasting station may provide audio content with or without video content.

The VOD provider and the AOD provider have characteristics different from the TV broadcasting station or the radio broadcasting station. That is, the VOD or AOD provider may provide a service that allows a user to store and play desired broadcast programs, movies, music, and/or other media content. For example, when a user cannot watch a desired program, the user can download or play the corresponding media file to watch it by connecting to a site that provides this broadcasting service.

The AOD provider may provide a streaming service of audio content. A MOD (Music On Demand) service provider may allow a user to download music.

The visual telephone provider provides a relay service such that a user can make a visual telephone call with a user of another network TV through a network. The weather information provider provides information on several local areas and the photograph-related service provider provides a tool for editing and storing photographs.

The content provider 20 may be any server operator who can provide various services to the network TV through the internet such as a PF (Packet Filter) server, an EPG service provider, an ECG (Electronic Content Guide) service provider, and a portal server operator, etc.

The PF server is serviced by an enterprise that manages by deputy all broadcasting information and location information, etc., which are provided by the content provider. This service usually contains broadcasting time of a corresponding broadcasting station, location information needed for broadcasting, and information that a user can contact.

The EPG service provides EPG information such that a user can search broadcast programs for each time period and find them for each channel.

The ECG service provides a user with information on contents that the contents provider has, the location of a connection server, and access authority to the connection server. That is, it is an electronic program guide that informs in detail a function that allows for easily connecting to servers having the contents, and information of the contents.

The portal server is a web service provided from each broadcasting station, and is connected to a web server of a broadcasting station or an enterprise that services contents, when receiving a request from a user terminal. The portal server may function to allow a program list to be searched that is provided by a broadcasting station or content provider who provide content services.

The network TV basically has a network interface for connecting with a network, receives and processes a data packet through the network, using an assigned IP address, and can store or play the data packet when the data packet is multimedia data, such as video or an audio data.

The network TV can bilaterally transmit a user's request while processing multimedia data. Further, buttons for controlling the network TV (e.g., buttons for selecting various menus) may be provided in an input device such as a remote controller or an operational button for controlling the network TV.

Figure 2:
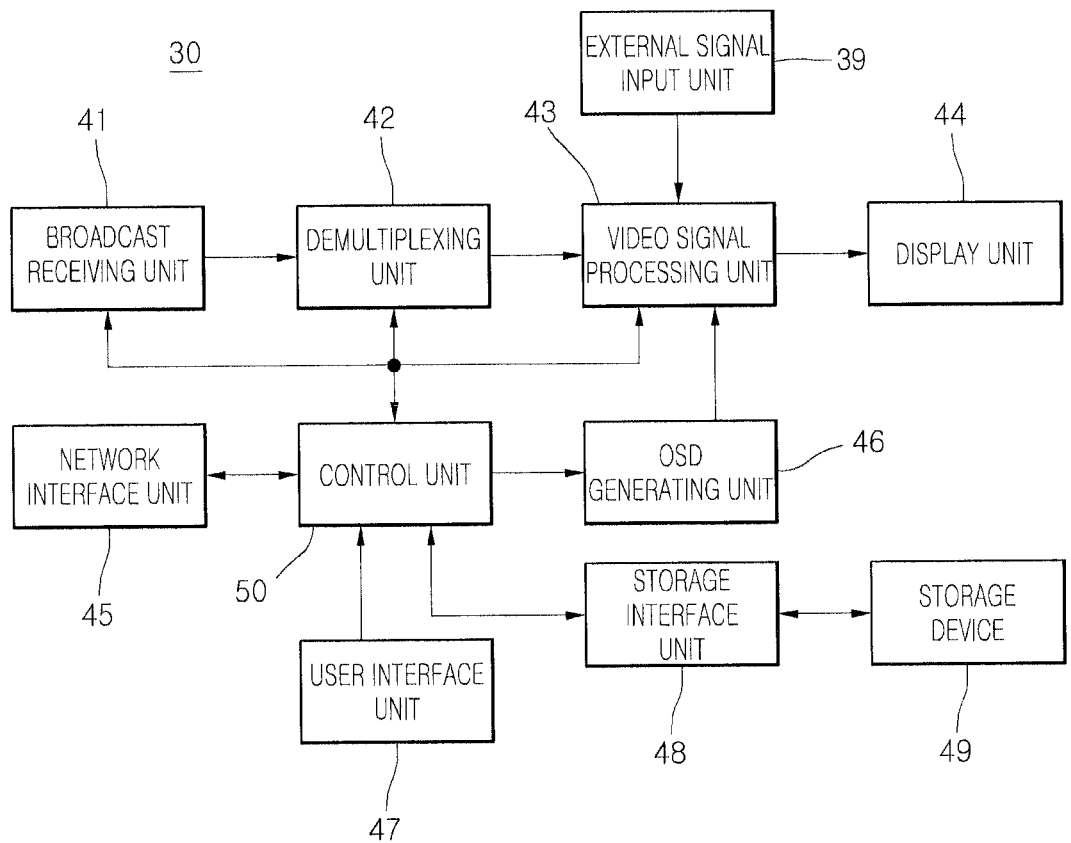
FIG. 2 is a diagram showing an example of the network TV.

FIG. 2 shows one embodiment of the network TV. Other than the function of receiving content through a network, the network TV may be provided with a function of receiving RF signal type broadcast signals by wireless communication or through a cable.

According to one embodiment, the network TV may include a broadcast receiving unit 41, demultiplexing unit 42, video signal processing unit 43, display unit 44, a network interface unit 45, OSD generating unit 46, user interface unit 47, storage interface unit 48, storage device 49, external signal input unit 39, and a control unit 50.

The broadcast receiving unit 41, demultiplexing unit 42, and video signal processing unit 43 may be formed in one broadcast processing unit that receives broadcast signals and processes them into a type which can be outputted to the display unit 44, by performing various processes.

When contents are provided by digital broadcasting, digital broadcast signals are transmitted in transport stream type packetized by time-division multiplexing video signal, audio signals, and addition data.

The broadcast receiving unit may include an antenna receiving broadcast signals transmitted from the outside, and may also include a tuner that tunes a broadcast signal having a corresponding frequency band in accordance with a tuning control signal of the control unit 50, which is described below, and a demodulator that outputs the broadcast signal of a predetermined tuned channel by performing a VSB (Vestigial Sideband) modulating process and an error correcting process to the broadcast signal.

The broadcast signal received by the broadcast receiving unit is divided into various additional data defined as a video signal, an audio signal, and a PSIP (Program and System Information Protocol) information etc. by the demultiplexing unit, and then outputted in a bit stream type.

The video data separated by the demultiplexing unit are processed by the video signal processing unit 43 and displayed by the display unit 44.

The video signal processing unit 43 may includes an MPEG-2 decoder and a scaler that converts the video data to meet vertical frequency, resolution, screen ratio, etc., corresponding to output standards of the display unit 44.

The display unit 44 may be any one of a variety of displays such as a DLP (Digital Light Processing), an LCD (Liquid Crystal Display), PDP (Plasma Display Panel) etc. Further, the audio signal may be processed by a voice signal processing unit (not shown) and outputted from a speaker, in which the voice signal processing unit may include an AC-3 decoder.

The additional data included in the additional data separated by demultiplexing unit 42 is stored in storage device 49 through storage interface unit 48. The storage device may be implemented by an EEPROM (electrically erasable programmable read-only memory) or another type of storage or memory device.

The user interface unit 47 may receive a request instruction from a user and generally includes an infrared receiving unit that receives an infrared signal inputted by a remote controller or a local key input unit disposed at one side of a panel.

The network interface unit 45 receives content or data from the content provider or the network operator through the network. That is, the network interface unit may receive content such as broadcast, games, VODs, broadcast signals, provided from the content provider and the associated information. Further, unit 45 may receive updated information of firmware and updates which the network operator provides.

The OSD generating unit 46 may generate a menu screen for receiving the user's determination signal in an OSD (On Screen Display) type. That is, the OSD generating unit may display content received through network interface unit 45 and the associated information through the display unit.

The external signal input unit 39 is an interface that can receive an input from other players, for example, DVD players, game machines, etc. It is possible to output multimedia stored in other players to the display unit 44 by connecting the players to the external signal input unit.

The control unit 50 may perform control operations in accordance with instructions input from user interface unit 47. The control unit may also receive and execute software of the content provider received from the network operator, i.e., an updated file of the firmware.

According to one embodiment, broadcast receiving unit 40 may output a 3D-image. The menu screen of the broadcast receiving unit may be provided in 3D and may also receive and output 3D-contents, when the contents provided by the content provider is 3D-contents. Additional components may be used in generating 3D-images.

Figure 3:
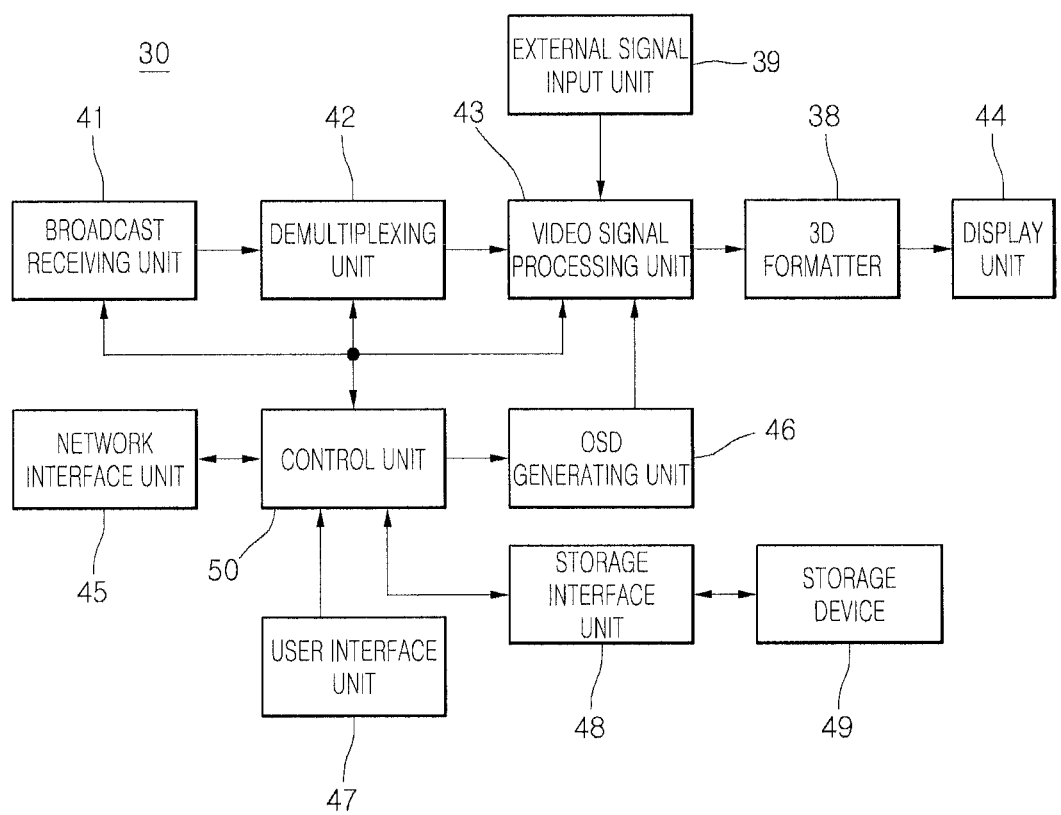
FIG. 3 is a diagram showing an example of network TV that generates a three-dimensional image.

FIG. 3 shows one embodiment of a broadcast receiving device that may be used to process a 3D-image. The operation of the other components except for 3D-formatter 38 is the same as that of FIG. 2.

As shown in FIG. 3, the 3D-formatter may be disposed at an output end of video signal processing unit 48. The 3D-formatter converts the image processed by the video signal processing unit into a 3D-image and transmits it to display unit 44. According to one embodiment, a specific 3D-formatter that converts an OSD output into 3D may be included in the OSD generating unit 46. Other technologies can be used to process a 3D-image.

Figure 4:
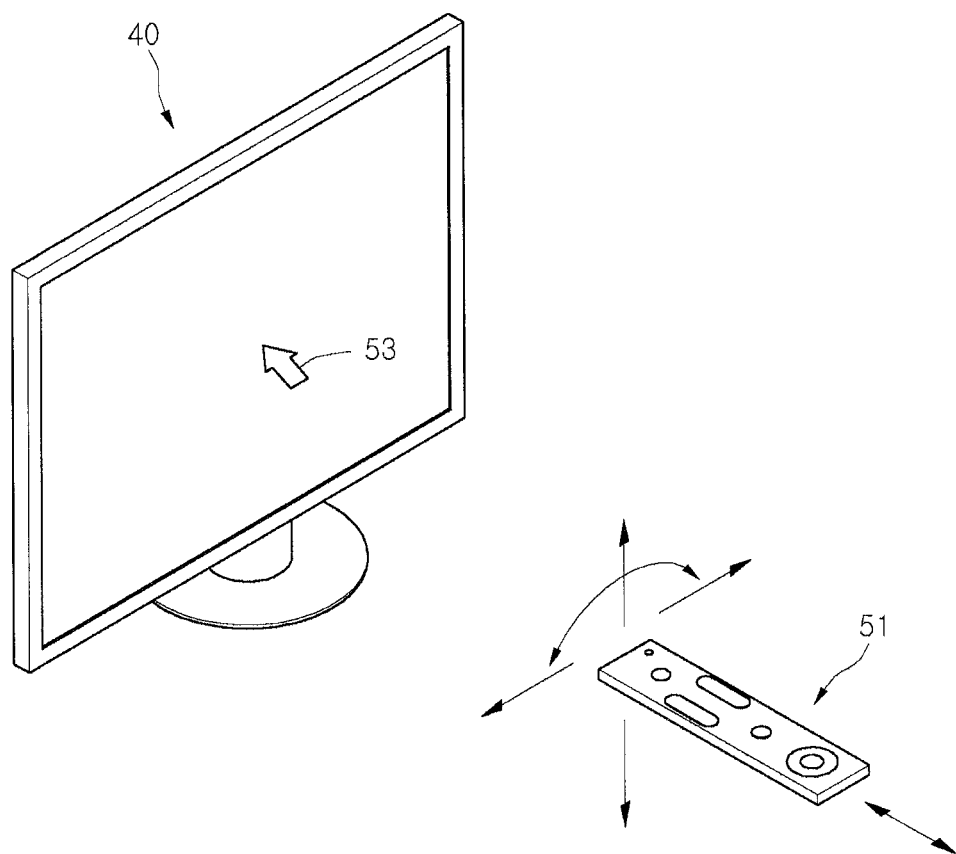
FIGS. 4 and 5 is a diagram showing an example of a remote controller or pointing device for controlling the network TV shown in FIG. 2 or 3.
Figure 5:
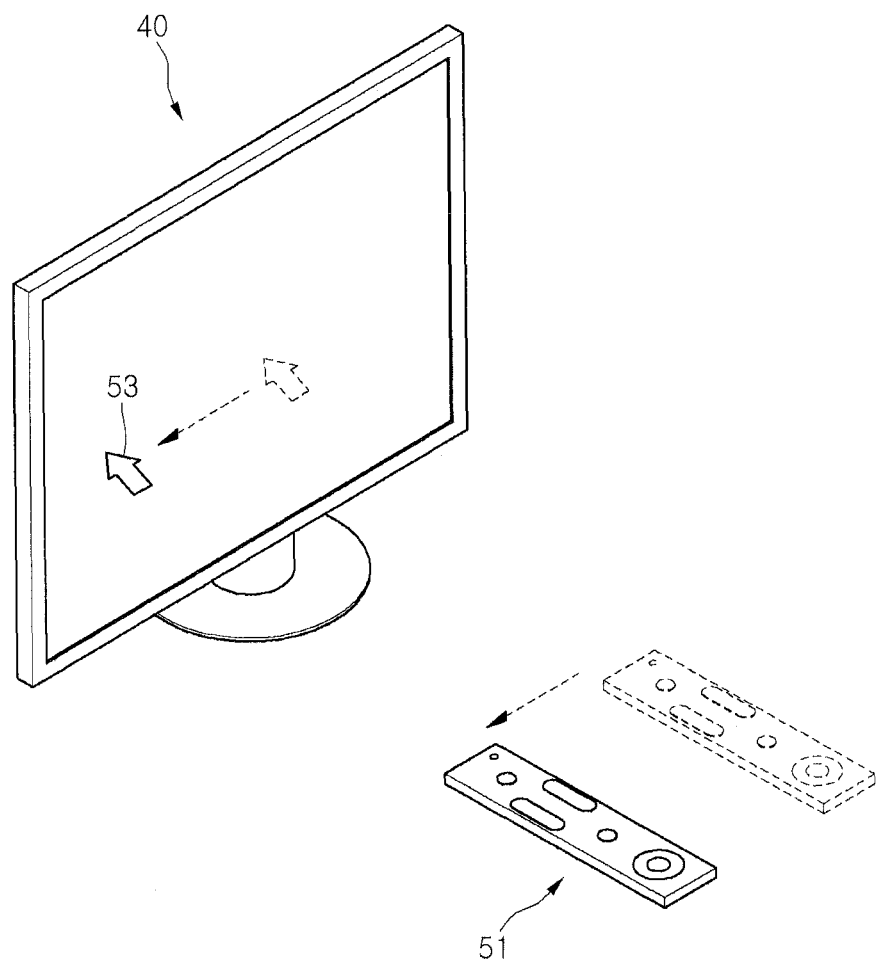

FIGS. 4 and 5 show examples of a remote controller for controlling the network TV shown in FIG. 2 or FIG. 3. The remote controller can transmit a control signal to control unit 50 through a wireless signal receiver that can be included in user interface unit 47 of the network TV and receive wireless signals, such as an RF signal or an infrared signal. The remote controller described with reference to FIGS. 4 to 5 is a remote controller that responses to not only a button input by a user, but a user's gesture, and which is referred to as a motion recognition remote controller 51 hereafter.

According to one embodiment, the motion recognition remote controller 51 can transmit/receive a signal to/from the network TV in accordance with an RF communication regulation. As shown in FIG. 4, a pointer 53 can be displayed at a position pointed by the motion recognition remote controller on the network TV.

A user can move or rotate the motion recognition remote controller up/down, left/right, and forward/backward. The pointer displayed on the network TV responds to the movement of the motion recognition remote controller.

FIG. 5 shows how a pointer displayed on the network TV may move in response to the movement of the motion recognition remote controller. As shown in FIG. 5, when a user moves motion recognition remote controller 51 to the left, the pointer displayed on the network TV correspondingly moves to the left.

The motion recognition remote controller may have a sensor that can recognize movement in this embodiment. Information on movement of the motion recognition remote controller which has been detected by the sensor of the motion recognition remote controller is transmitted to the network TV. The network TV may determine movement of motion recognition remote controller 51 on the basis of the information on the movement of the motion recognition remote controller and may calculates corresponding coordinates of pointer 53. An acceleration sensor, a gyrosensor, or a geomagnetic sensor may be used for the sensor that can recognize movement.

FIGS. 4 and 5 show an example when the pointer moves in response to up/down and left/right movement or rotation of the motion recognition remote controller 51. The movement velocity or direction of the pointer may respond to the movement velocity or direction of the motion recognition remote controller.

In this embodiment, a pointer displayed on the network TV moves in response to motion of the remote controller. According to one example, a predetermined instruction may be input into the TV in response to motion of the remote controller. That is, when the motion recognition remote controller moves forward/backward, the size of an image displayed on the network TV can be increased or decreased.

Figure 6:
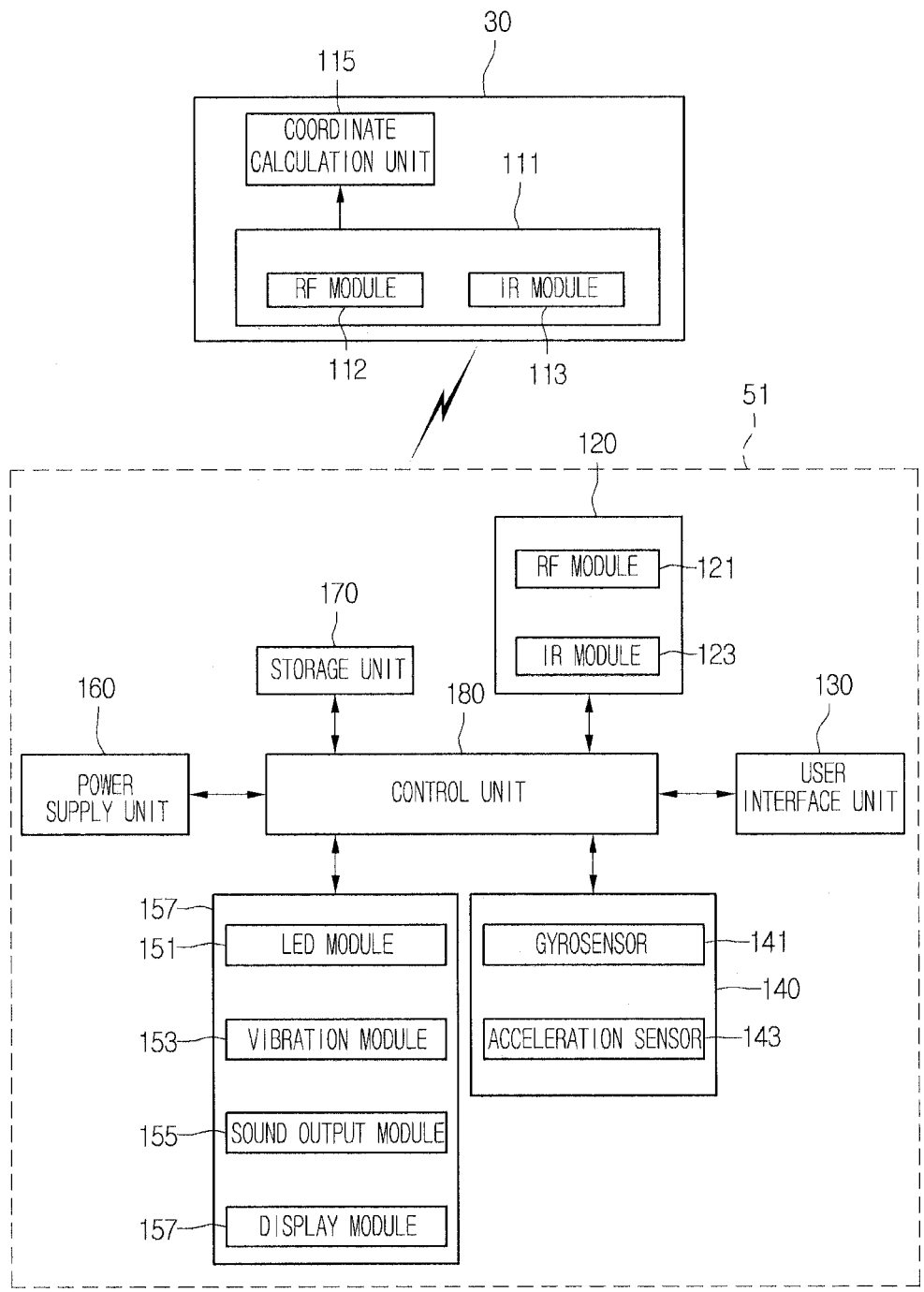
FIG. 6 is a diagram showing one embodiment of the internal structure of an interface unit of the network TV shown in FIG. 1 and a motion recognition remote controller included for the network TV in FIG. 3.

FIG. 6 shows one embodiment of interface unit 47 of the network TV of FIG. 1 and motion recognition remote controller 51 of FIG. 4. As shown, the network TV may include a coordinate calculation unit 115 and a wireless communication unit 111. The coordinate calculation unit may be included in the control unit. The wireless communication unit may be included in the user interface unit. The wireless communication unit may include an RF module 112 or an IR module 113.

The motion recognition remote controller 51 may include a wireless communication unit 120, a user input unit 130, a sensor unit 140, an output unit 150, a power supply unit 160, a memory 170, and a control unit 180.

The wireless communication unit transmits/receives a signal to/from the network TV. The motion recognition remote controller may have an RF module 121 that can transmit/receive a signal to/from the interface unit 40 of the network TV under the RF communication regulation. Further, the motion recognition remote controller may have an IR module 123 that can transmit/receive a signal to/from the interface unit 40 of the network TV under the IR communication regulation.

The motion recognition remote controller may transmit a signal carrying information on motion of motion recognition remote controller 51 to the network TV, using RF module 121. Further, the motion recognition remote controller may receive a signal transmitted from the network TV, using the RF module. Further, the motion recognition remote controller may transmit, if needed, an instruction about power-on/off, a channel change, a volume change etc. to the network TV, using IR module 123.

The user input unit 130 may include a key pad or buttons. A user may input an instruction relating to the network TV, using the motion recognition remote controller 51, by operating the user input unit. When the user input unit has a hard key button, a user can input an instruction relating to the network TV, using motion recognition remote controller 51, by pressing the hard key button.

When the user input unit 130 has a touch screen, a user can input an instruction relating to the network TV, using motion recognition remote controller 51, by touching the soft key of the touch screen. Further, the user input unit may have a variety of input devices that a user can operate such as a scroll or jog key or other input device.

The sensor unit 140 may include a gyrosensor 141 or acceleration sensor 143 as a motion sensor. The gyrosensor may detect movement of the motion recognition remote controller. For example, the gyrosensor may sense information on movement of the motion recognition remote controller about x-, y-, and z-axes. The acceleration sensor may sense information on movement velocity, etc., of the motion recognition remote controller. The output unit may output an image or voice signal corresponding to operation of the user input unit or a signal transmitted from the TV. A user can recognize whether the input unit is operated or TV is controlled, from output unit 150.

For example, the output unit may include one or more of an LED module 151 that is turned on/off, a vibration module 153, a voice output module 155, or a display module 157 that outputs video, when the user input unit is operated or the network TV transmits/receives a signal to/from wireless communication unit 120.

The power supply unit 160 supplies power to motion recognition remote controller 51. The power supply unit may reduce the waste of power by stopping supplying power, when the motion recognition remote controller does not move for a predetermined period of time. The power supply unit may start again to supply power, when a predetermined key of the motion recognition remote controller is operated.

The memory 170 can store various types of application data for operating or controlling motion recognition remote controller 51. If the motion recognition remote controller transmits/receives a signal by wireless to/from the network TV, using the RF module 121, motion recognition remote controller 51 and the network TV transmit/receive a signal in a predetermined frequency band. The control unit 180 of the motion recognition remote controller 51 can store information on the frequency band where wireless communication of a signal with the network TV paired with the motion recognition remote controller 51 to the memory 170, and refers to it.

The control unit 180 of the remote controller may transmit a signal corresponding to the operation of a predetermined key of user input unit 130 or a signal corresponding to operation of the remote controller sensed by sensor unit 140, to the wireless communication unit of the TV using wireless communication unit 120.

The network TV may have the wireless communication unit that can transmit/receive a signal by wireless to/from the motion recognition remote controller 51 and the coordinate calculation unit 115 that can calculate coordinates of the pointer, which corresponds to motion of the motion recognition remote controller 51.

The wireless communication unit 111 can transmit/receive a signal by wireless to/from the motion recognition remote controller 51, using the RF module 112. Further, it can receive a signal transmitted from the motion recognition remote controller 51, using the RE module 112, under the IR regulation.

The coordinate calculation unit 115 can calculates coordinates (x,y) of the pointer 53 that will be displayed on the display 49 by correcting hand tremble or an error, on the basis of a signal corresponding to motion of the motion recognition remote controller 51 which has been received through the wireless communication unit 111.

Further, the signal transmitted from the motion recognition remote controller 51 to the network TV through the interface unit 40 is transmitted to the control unit 47 of the network TV. The control unit recognizes information on key operation and motion of the motion recognition remote controller on the basis of the signal transmitted from the motion recognition remote controller and can control the network TV on the basis of the recognized result.

A menu screen of the network TV and a method of operating the menu screen will now be described. According to one embodiment, the 'menu screen' of the network TV may be an initial screen or main screen when the network TV enters an operation mode (hereafter, referred to as Netcast mode) that provides a menu allowing the network TV to select and connect with one of a plurality of contents provider. The menu screen may include a plurality of icons 212 representing a plurality of content provider and may also include a background image 201 having a specific subject.

Figure 7:
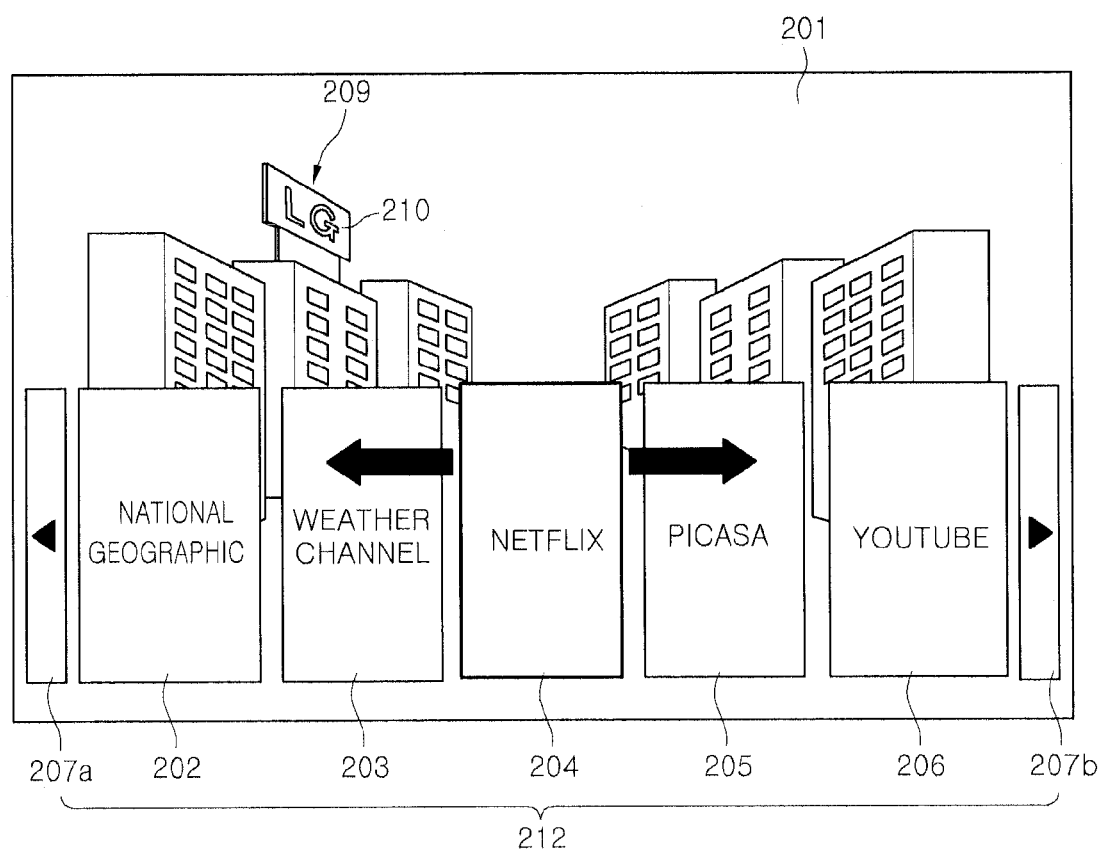
FIG. 7 is a diagram showing one embodiment of a menu screen displayed on the network TV.

FIG. 7 shows an example of a menu screen which may be generated on the network TV. In this example, an image of a city is shown as the background image of the menu screen and icons 212 representing content providers are shown over the main screen. The image of the menu screen may include any type of theme, location, specific subject or other features or any combination thereof, including but not limited to various subjects such as a jungle, department store, beach, universe, and/or scene of fairy tales. The background image may also include graphical objects that can be displayed, for example, by selectively inserting a basic and/or other images corresponding to a subject.

The icons may correspond to one or more buttons for connecting with a respective number of content providers, and a user can access one or more desired services from a content provider by selecting one of the icons.

Additionally, the icons may relate to the background image. According to one example, the icons may be graphical objects corresponding to a subject or other feature in the background image, e.g., as shown in FIG. 7 icons 212 can be displayed in the shape of a structure or a sign board on a road of a city. The images displayed on the icons may be provided by one or more of the contents providers and/or based on information stored within the network TV or other external source. A user may use motion recognition remote controller 51 to select the icons.

When background image 201 (e.g., a location or area) is changed based, for example, on user information, the icons and/or the images displayed on the icons can be commensurately changed.

According to one example, the content providers corresponding to the icons may include or contain National Geographic 202, Weather Channel 203, Netflix 204, Picasa 205, and Youtube 206 as shown in FIG. 7. The National Geographic provider may provide national science content, the Weather Channel 203 may provide weather information corresponding to a specific area, Netflix is a content provider that provides movie content, Picasa provides photographs or other related content, and the Youtube is a content provider that provides VOD (Video on Demand) content.

According to one embodiment, various types and/or numbers of icons can be additionally displayed on the menu screen. Scroll bars 207a and 207b may be disposed at left and right sides of the icons to allow the additional icons to be displayed when a user selects the scroll bars.

According to another embodiment, an image display region where another image may be displayed is defined at a portion of the background image, such that it is possible to display other images showing an advertisement image or a message in the image display region. The advertisement image may include an advertisement and/or other image that may include predetermined information corresponding to a guide message. The advertisement information or other images may be provided by the network operator and/or the content providers.

According to another embodiment, the image display region can be disposed a predetermined position of background image 201, and may be disposed at an appropriate position in consideration of a subject or other feature in the background image. For example, as shown in FIG. 7, image display region 209 may be disposed at an outdoor sign board position and an advertisement image can be displayed.

The image display region can have various shapes in accordance with the subject or other features in the background image. For example, when the subject of the background image is a park, the image display region can be disposed at a pond or a tree that can easily seen in the park, or when the subject of the background image is a department store, the image display region can be disposed at a show window that can be easily seen in the department store.

As previously described, a message or advertisement may displayed in a creative manner without boring a user. This may be accomplished, for example, by displaying an image in image display region 209 to be harmonized with the background image. Detailed and various methods of displaying a message or an advertisement in the image display region 209 are described below.

When a user selects one of icons 212, for example, the Netflix icon 204 when selected is highlighted so as to discriminate it from the other icons. The icon may be selected using a screen arrow or cursor operated by the motion recognition remote controller. When another icon is selected, the other icon may be highlighted and the previous icon deemphasized. With the icon is selected, when the ENTER or another button of the remote controller is pressed, a connection is established with the server of the content provider corresponding to the selected icon and an initial or predetermined screen of the server of the content provider is displayed.

The number, size, position, and/or arrangement of icons displayed on one screen can vary in different applications or embodiments.

The icons can include or may be associated with a name or image for distinguishing among the content providers. In addition, each network TV may store in an internal memory device a number of built-in icons, images, or other features provided, for example, by the TV manufacturer. Additionally, network operator 10 may provide each network TV with images, information, or other features that correspond to the icons from one or more content providers 20. New images, information, of features may be transmitted to the network TV in this manner or images, information, and features already stored in the TV may be updated. Further, the network TV may directly connect with the servers of the content providers 20 for receiving downloaded images.

Figure 8:
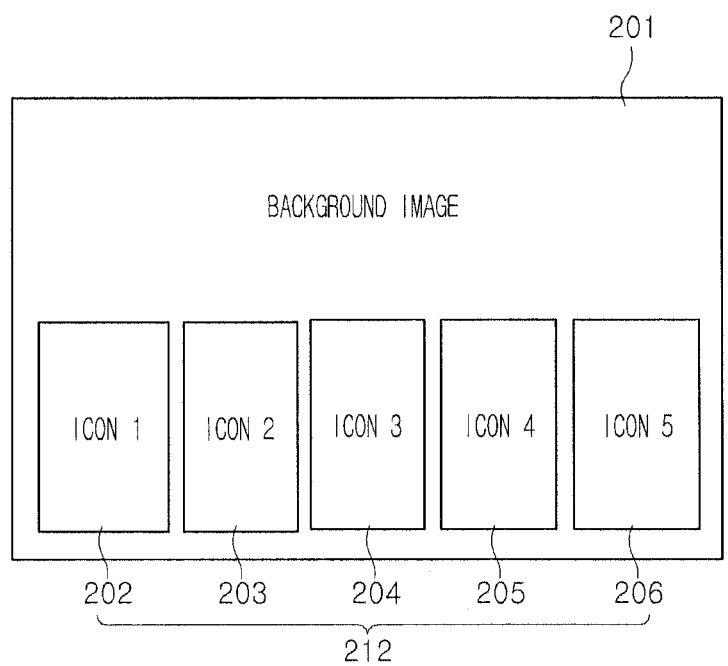
FIGS. 8 and 9 are diagrams showing examples of menu screens that may be generated in accordance with the embodiments described herein.
Figure 9:
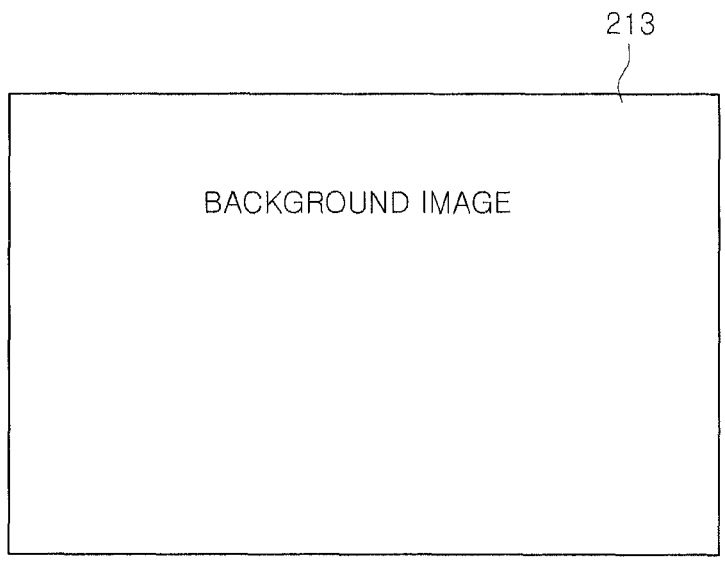
Figure 9:
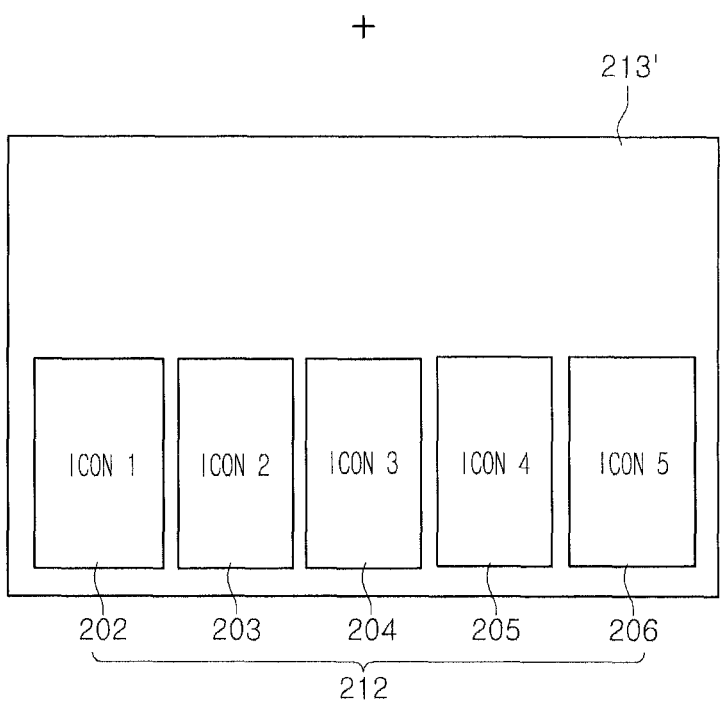

FIGS. 8 and 9 show examples of menu screens that include a background image and icons 212. As shown in FIG. 9, one menu screen may include a number of icons 212 disposed over background image 201. The menu screen may be implemented by overlapping a layer 213 including the background image with a layer 213' that includes the icons.

According to one embodiment, different effects may be applied to or associated with layers 213 and 213'. For example, the icons may be translucently displayed to allow, for example, all or a portion of the background image to be visible through the icons or only the background image may be translucently displayed to allow the icons to be visible through the background image. Other effects including animations, movement of graphical or animated objects or features, or other visual and/or audible effects may be performed in association with the icons and/or background image.

FIGS. 10 to 15 show additional examples of menu screens where various effects may be performed relating to icons selected by a user. The effects may, for be performed when, for example, an icon is selected in the Netcast service or another mode.

One effect may involve displaying an image relating to a content provider of one or more of the icons (whether selected or not). The image may be one stored in the network TV or in a unit coupled to the TV, and/or the image may be received through the network from a content provider. In this latter, the content provider controls which image is to be displayed.

Another effect may be to display a video, animation, or a still image in association with the background image and/or one or more of the icons. According to one embodiment, the content provider may provide information needed to perform these effects directly to the network TV or the effects may be made available from another manufacturer or party by request for direct or indirect transmission to the network TV through the network operator or other network entity.

Figure 10:
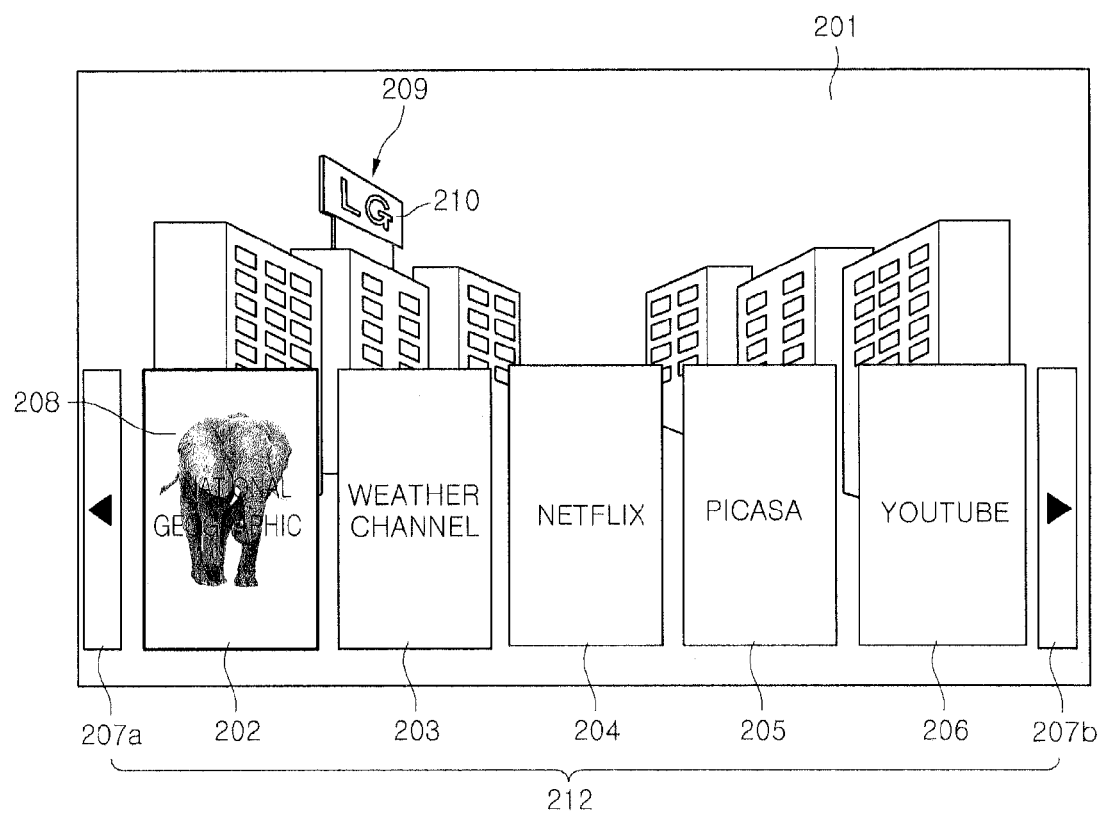
FIGS. 10 to 15 are diagrams showing various menu screens, background images, and/or effects generated in accordance with one or more embodiments herein.

Referring to FIG. 10, when a user selects the icon corresponding to a national science (e.g., National Geographic) provider, a video relating to subject matter of National Geographic may be displayed in association with the national science icon at another location. The video or another effect may be displayed while a current background image 201 and the images of the icons 212 are maintained.

For example, since the National Geographic provides content relating to animals, when the National Geographic icon is selected, a video showing an animal 208 (e.g., an elephant walking in relation to one or more of the icons) can be displayed. Alternatively, a video showing an eagle flying in the sky in the background image or a video showing a variety of animals coming out from one side of the screen can be displayed. The video effects may, for example, be implemented using a flash program.

The videos may relate to content providers represented by icons 212 and can be controlled by the content providers. That is, content may be directly made by the content providers or manufacturer by request and can be transmitted through network operator 10 or directly to the network TV for storage therein.

In accordance with another application, a video that contains an animal moving in front of or around structures in a city in the background image or icons may be displayed. This may be an animation of the content provider, and this effect can allow a user to acquire intuitive information on selected icons for fun or interesting to viewing.

When a user presses a specific button of the motion recognition remote controller (e.g., the ENTER button or another button) while a video is being played, a connection may be established with a server of the content provider of National Geographic. Through this connection, an initial or other predetermined screen of a service corresponding to National Geographic can be displayed on the network TV. Thereafter, the user may be provided with content by selecting the content provided by National Geographic on the screen.

The above videos may be in a format that can be executed by the network TV as provided by content provider 20 on the basis of, for example, system information or software of the network TV. This system information or software may be provided by the manufacturer of the network TV, either at the time of manufacture or during a download operation. The network TV manufacturer can provide a user with a product having the software of the network TV including the corresponding video such that the video can be played. According to embodiments, the network TV manufacturer may make a video and include it in the software of the network TV.

According to one embodiment, in the network system of FIG. 1, each content provider 20 may make a video and transmit it to network operator 10, after receiving system information of the network TV from the network operator or the network TV manufacturer. The network operator may transmit an updated file including the video file to the network TV and then the network TV can display the video as described above by executing the updated file. The displayed video can be updated by the above method.

Further, according to one or more embodiments, an image, which is displayed when an icon 202 is selected, may be changed in accordance with a time and a season of the year. Further, when a content provider starts to provide new contents, it is possible to display a video relating to the newly provided contents. The video relating to the new contents can be displayed by updating the video in the above method. Even if new contents are not provided, a user may be permitted to use the Netcast service, without being bored, by periodically updating the video.

Figure 11:
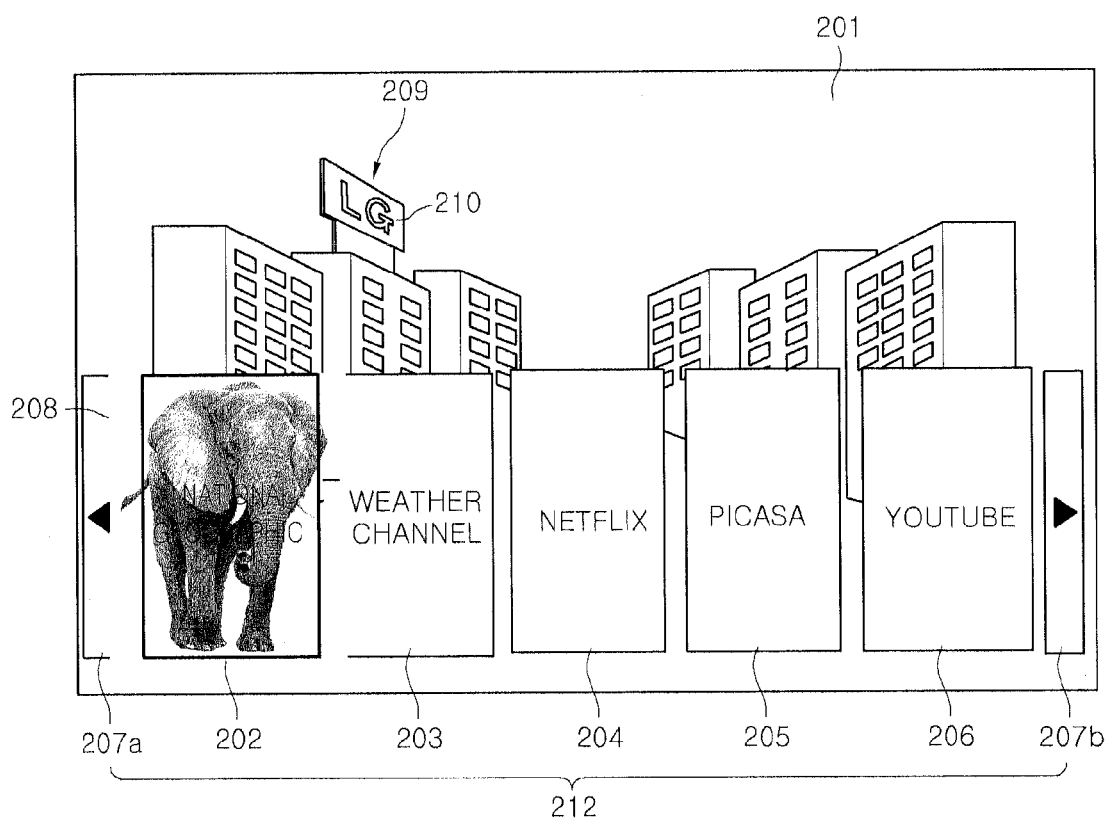

Further, according to one or more embodiments, it is possible to display a three-dimensional image when an icon 202 is selected. For example, when the National Geographic icon is selected in FIG. 10, it is possible to provide an effect as if the elephant 208 is walking toward a user, as shown in FIG. 11. This embodiment can provide more fun when the icons or background image is implemented in a 3D-image.

Figure 12:
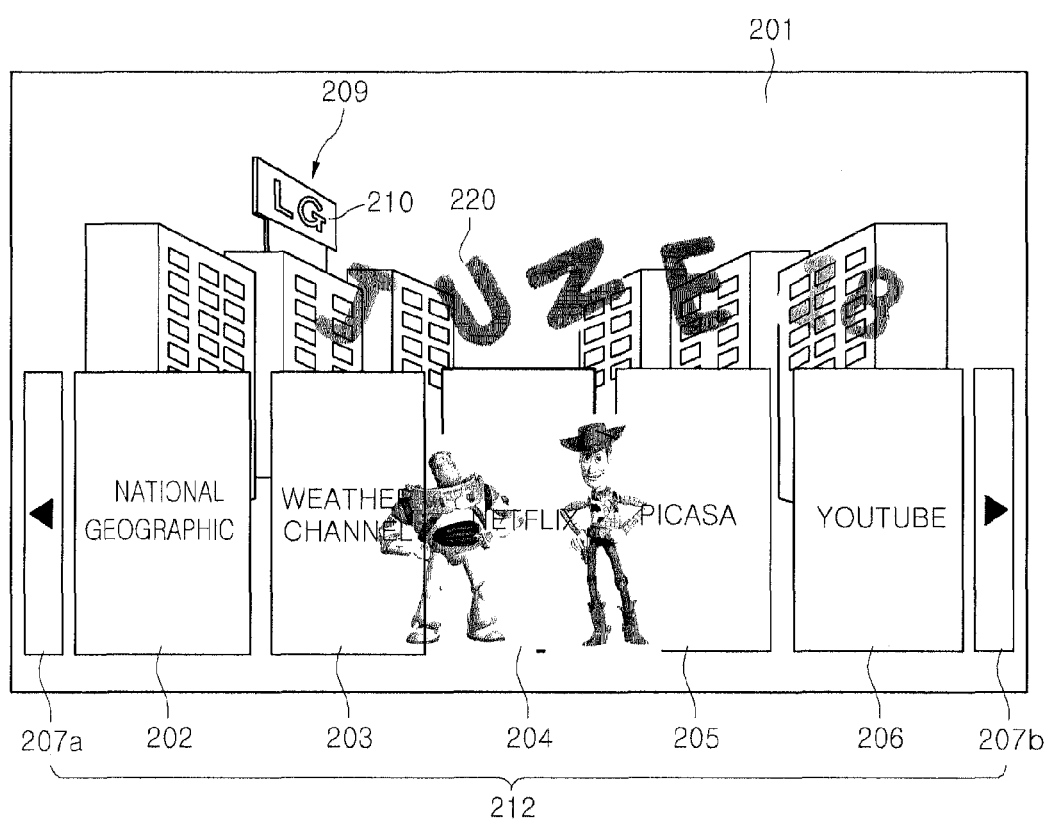

Referring to FIG. 12, according to one embodiment, when a user selects a content provider which provides movie content (for example, icon 204 of Netflix), a video relating to contents provided by Netflix may be displayed. The displayed video may relate to or displayed in association with the background image 201 or icons 212. That is, one or more subjects or features in the video may be displayed in a way that makes it appear as if the subjects or features are moving within the environment of the city provided in the background image 201 and the icons 212.

For example, as shown in FIG. 12, it is possible to display a video of the characters of the Toy Story. Further, according to one embodiment, the video may be made to display specific information. For example, assuming that Netflix plans to provide service for the movie, Toy Story, on a specific date, for example, 18 June, it is possible to display a video in which the characters throw up letters of "J", "U", "N", "E", "1", and "8" 220, one by one, over the structures or sign boards relating to the icons 212. By the configuration described above, a user can recognize that the selected icon provides movie content and have fun, while the content provider advertises specific content.

The video shown in FIG. 12 may be displayed by an animation implemented by a flash program and updated by the method described above. Further, the video of FIG. 12 can also be implemented and displayed in a 3D-image.

Similar to the embodiment shown in FIG. 10, when a user presses a specific button of the motion recognition remote controller, for example, an OK button while a video is displayed, it is possible to display the initial screen by connecting with the Netflix server. When another button (for example, a cancel button) is pressed, the displayed video can be stopped. It is possible to display information on the displayed video, that is, the Toy Story, on the initial screen provided when connecting with the Netflix server.

Figure 13:
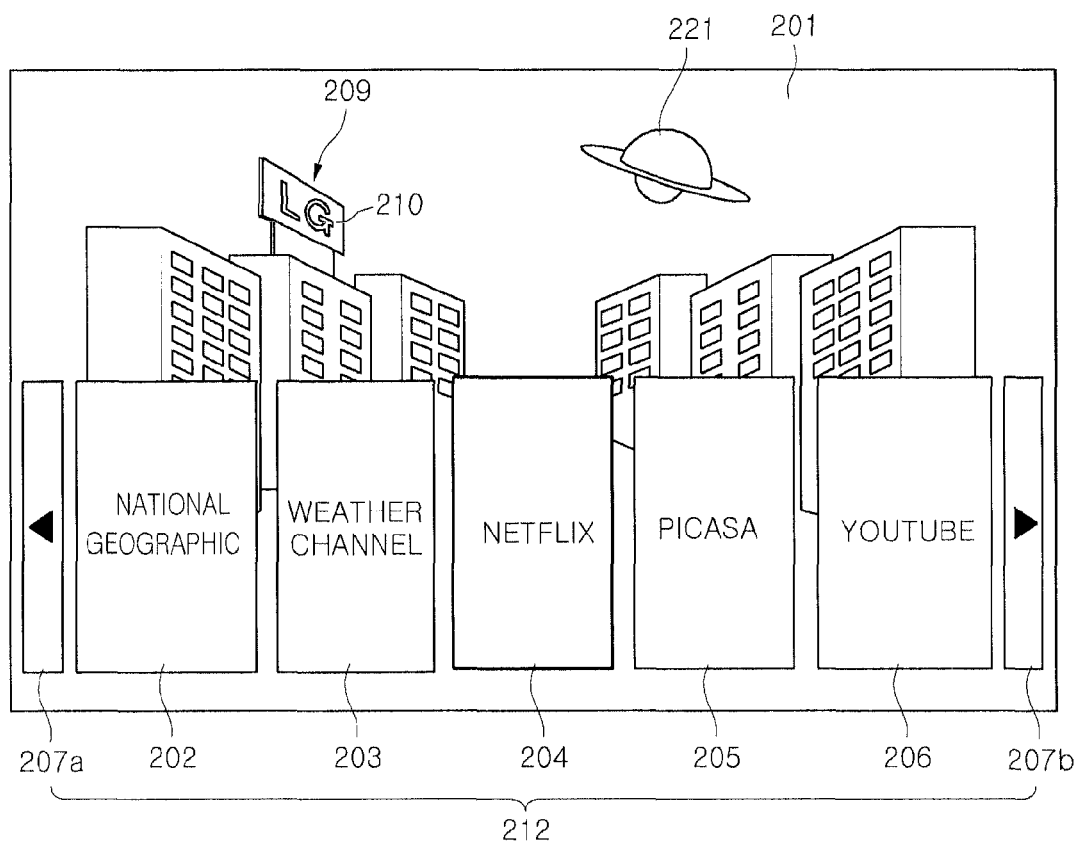

Referring to FIG. 13, when a user selects icon 204 of Netflix that is the content provider of movies, it is possible to display a video in which an object in a predetermined movie, for example, a spaceship 221 of "StarWars" flies in the sky of the city background image 201.

When the user presses a specific button while the spaceship 221 flies, it is possible to connect with the Netflix server and display an initial screen of Netflix. It is possible to display the detailed information on the displayed video, that is, the movie relating to the spaceship 221, that is, StarWars, or an advertisement video (trailer), on the initial screen of the Netflix. The price of the content of StarWars may be displayed during or after the advertisement video is played, and it is possible to provide the movie contents of StarWars to the network TV, when the user decides to purchase the content.

Figure 14:
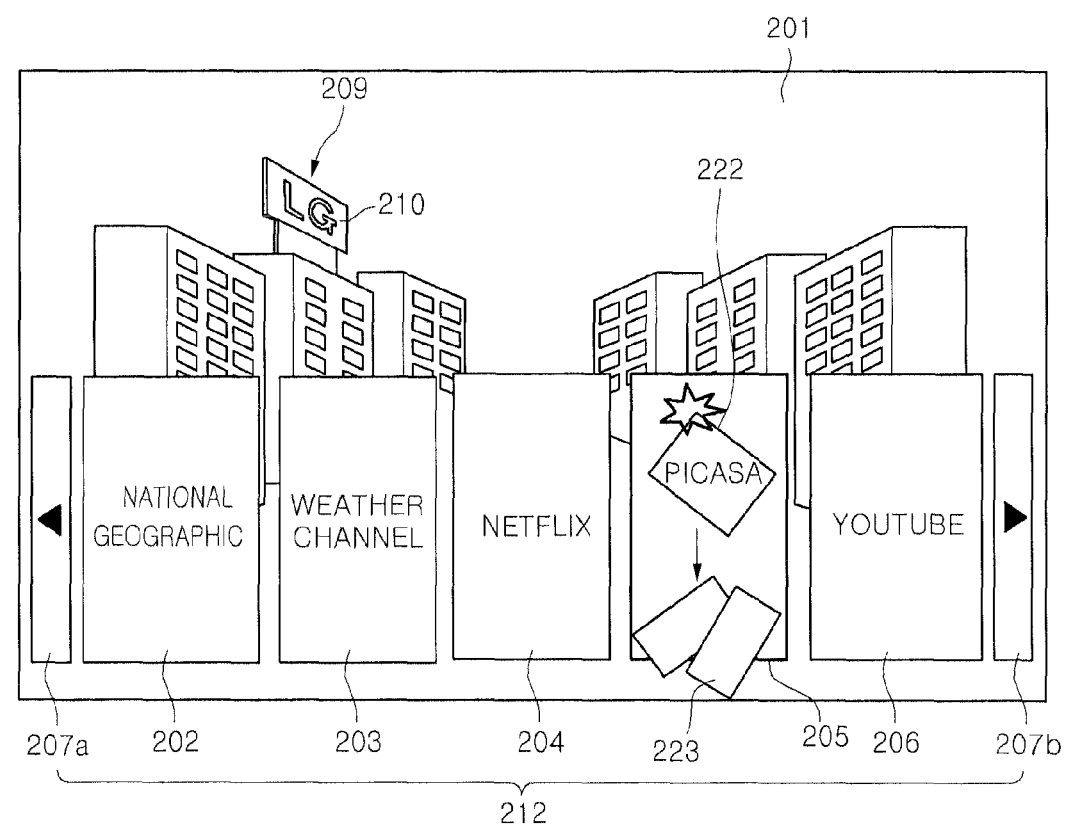

Referring to FIG. 14, when a user selects the provider of photograph content, for example, Picasa icon 205, a video relating to photographs can be displayed. Similar to the embodiment described above, the displayed video or other effect may be activated in relation to the background image or the icons in the main screen.

For example, when a user selects Picasa icon 205, the sound generated when taking a photograph may be output with a photograph frame 222 displayed in or relative to icon 205. In addition, or alternatively, an effect may be performed in which a photograph appears to fall down and be stacked with other photographs at a lower end 223 or in front of the icon. Similarly, when the user presses the OK button in the above state, a connection may be established with the Picasa server and an initial or predetermined screen of Picasa is displayed.

Figure 15:
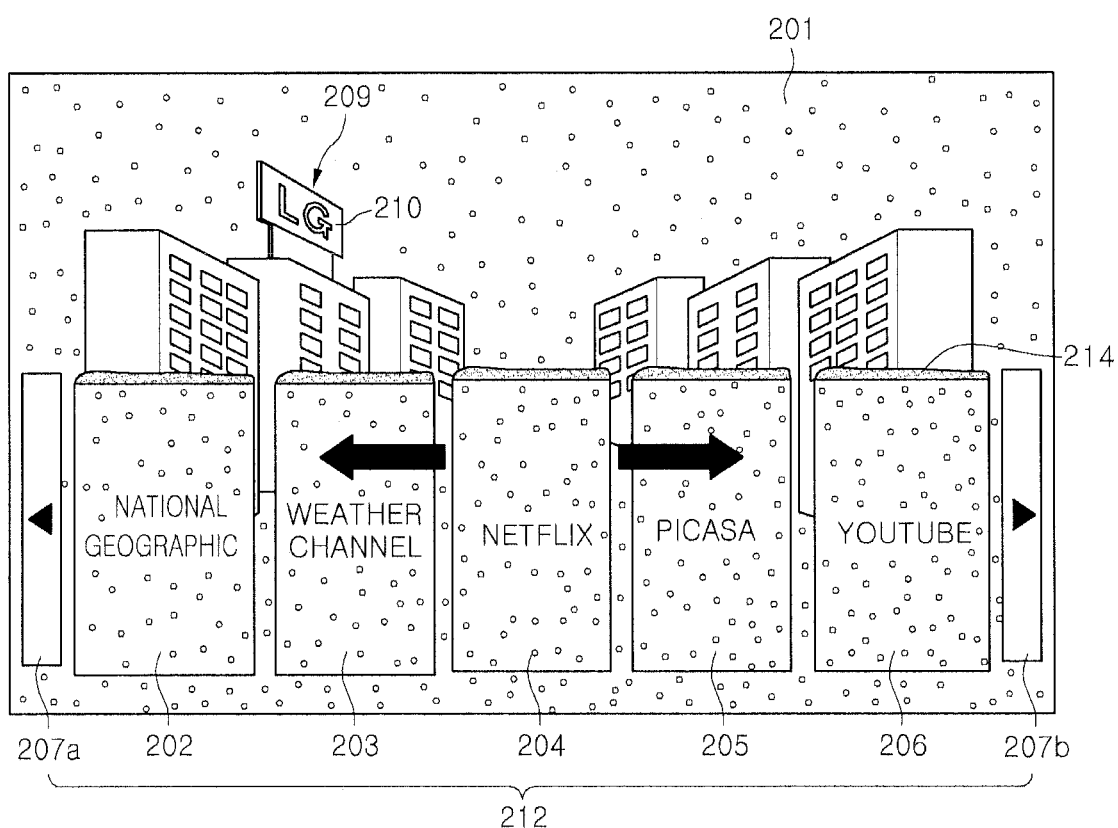

FIG. 15 shows an example of displaying a video or effect relating to weather over background image 201, when a user selects an icon 203 corresponding to a weather information content provider. The effect may involve, for example, snow falling down over the city background image and/or icons in the menu screen.

When icon 203 is selected, weather information may be received on the area where the current network TV is located. An effect corresponding to this weather information may then be displayed in the city included in background image 201. For example, an image where a sun is high in the sky can be displayed over the background image when current or forecasted weather conditions are clear for the location of the network TV. Or, the screen can be darkened or a cloud image may be displayed when the weather conditions are cloudy, Or, an image showing rain can be displayed when rainy weather conditions are forecasted or exist. Or an image showing snows can be displayed when snow exists or is forecasted.

The weather information depends on the area information of the network TV, that is, the position. The weather information contents provider has all the weather information of the service area, and receives the position information of the network TV and then transmits weather codes corresponding to the information to the network TV. The network TV may store a video corresponding to each weather code, and loads and displays a video corresponding to a weather code received from the weather information contents provider, when a user selects the Weather Channel icon 203.

Figure 16:
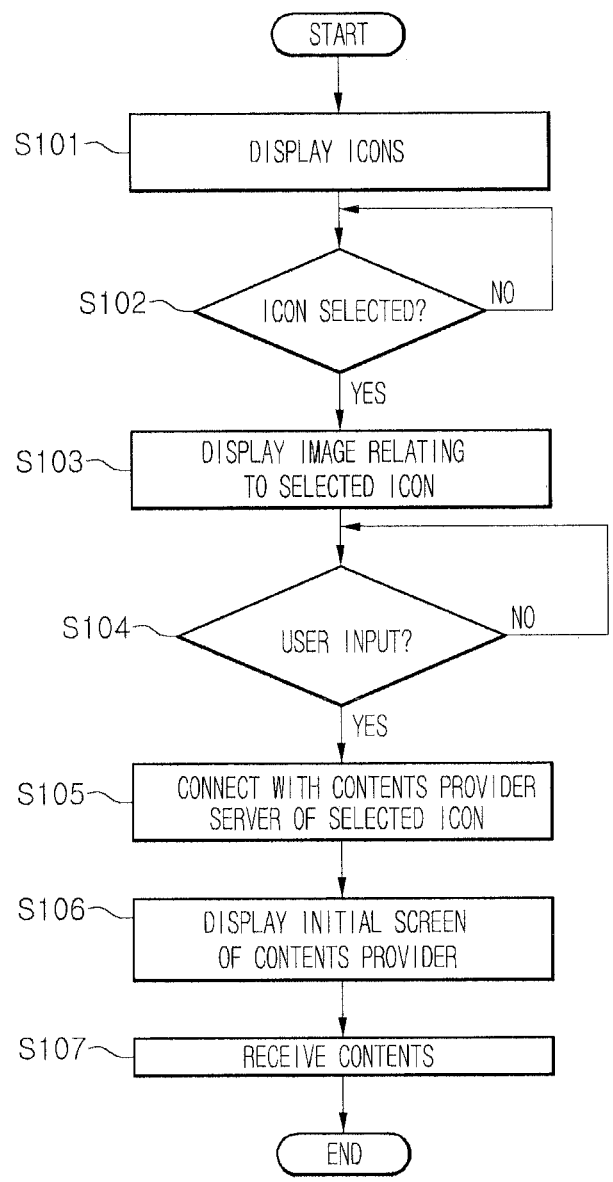
FIG. 16 is a diagram showing operations included in one embodiment of a method for displaying media information.

FIG. 16 shows operations included in one embodiment of a method for displaying a video in accordance with a selected icon, in a menu screen including background image 201 and icons 212.

In step S101, a menu screen including icons representing content providers is displayed. The background image can be displayed with the icons.

In step S102, one of the icons is selected by a user.

In step S103, an image relating to the icon selected by the user is displayed, with the background image and the icons still displayed. The image may be a video, an animation, or still image and may relate to the content provider represented by the selected icon. For example, as described with reference to FIGS. 10 to 15, the image may be a video that relates to the icon or the corresponding contents provider, is provided by the corresponding contents provider, or can be controlled by the contents provider.

In step S104, when there is a user input while the image is displayed, in step S105, a connection with the server of the content provider of the selected icon may be established. When there is no user input, the image can be kept repeatedly displayed, or a plurality of different videos may be sequentially displayed.

In step S106, the initial screen of the content provider server is displayed, and in step S107, content is provided in accordance with the service that is usually provided by the network TV.

Meanwhile, according to one embodiment, an image including a message or an advertisement can be displayed on the menu screen of the network TV, regardless of a user input. The message may be an advertisement image of other images provided by the network operator or contents provider.

As described above, background image 201 of the menu screen of the network TV may include an image display region where an image can be displayed, and the image display region may be disposed at a predetermined fixed position or moved to other positions.

A fixed-type display region may be disposed at a fixed position on the background image. For example, image display region 209 of FIG. 7 is set as a fixed type and an image such as an advertisement or other information can be selectively displayed in the image display region. The displayed message or advertisement can be changed or updated by content provider 20 or network operator 10.

In another application, a movable image display region may move on or be adjusted relative to the background image. The image may not normally be displayed at this location on the menu screen, but can be displayed at this location on the menu screen by generating an interrupt in the control unit of the network TV.

FIGS. 17 to 20 show additional menu screens that include a message or advertisement, displayed at a fixed or movable display region on a background image.

Figure 17:
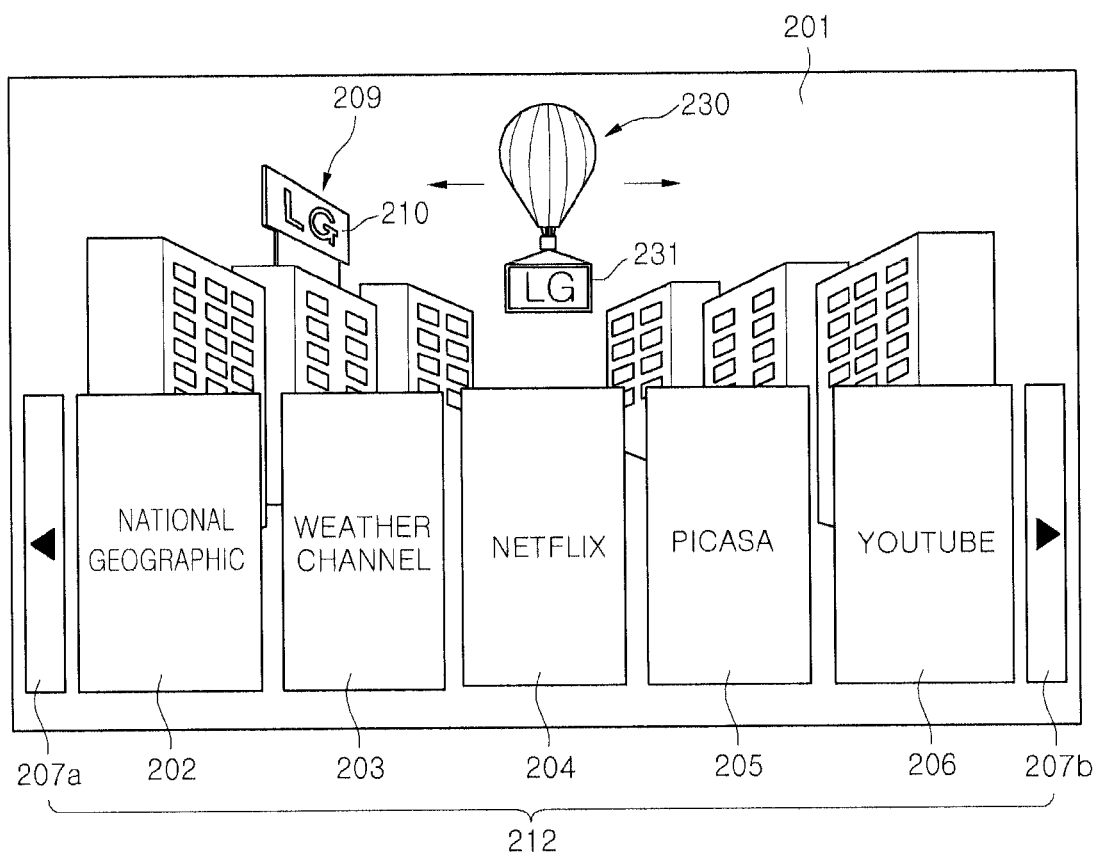
FIGS. 17 to 20 are diagrams showing screens that include various types of messages or advertisement images that may be generated in accordance with one or more embodiments described herein.

Referring to FIG. 17, after a predetermined time passes with the menu screen displayed, a predetermined message or advertisement can be displayed on the menu screen, regardless of whether a user selects an icon. The image can be displayed in the movable image display region. Preferably, the image display region may relate to the subject of the background image. For example, when the subject of the background image is a city as shown in FIG. 17, an image display region with a fire balloon 230 flying in the sky can be used. The fire balloon may have a box 231 and the box may correspond to the image display region where a predetermined message or advertisement is displayed.

The image representing the movable image display region, that is, fire balloon 230 and box 231, can be provided by the network operator 10 and a message or and advertisement image that will be displayed in the movable image display region can be provided by network operator or content provider. When an advertisement is displayed, the advertiser may be the content provider or any manufacturer. When an advertisement image is displayed in the movable image display region, the advertisement may include an advertisement expression or the company logo. The movable image display region can be implemented by an animation, using a flash program.

The above configuration may be effectively used when network operator 10 or an advertiser wants to display a message or an advertisement to a user.

When the user selects fire balloon 230, detailed information relating to a corresponding message can be displayed, the home page of the advertiser can be connected to and displayed, and/or an advertisement provided by a corresponding advertiser can be displayed as the fire balloon flies on the screen. The fire balloon may be selected using, for example, a motion recognition remote controller or by pressing a specific button (for example, the ENTER button or a button).

According to another embodiment, an advertisement image 210 may be displayed on an outdoor sign board that is at a fixed location on image display region 209 in FIG. 17. The advertisement image may be provided by content provider 20 or network operator 10 and can be changed to fit image display region 209. That is, the image display region may be tilted, e.g., not facing towards the front of the screen as seen by a user. The network operator or TV may be provided with an advertisement expression from the content provider or a predetermined advertiser. This expression may be appropriately formatted and transmitted to TV 30 to fit into image display region 209. See FIG. 20.

Figure 18:
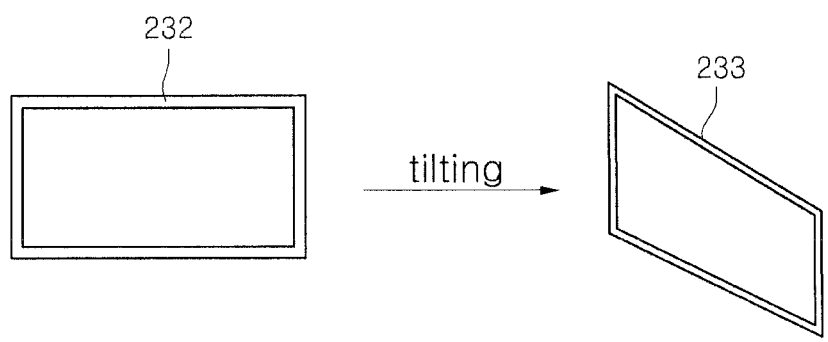

Referring to FIG. 18, the original image 232 provided by content provider 20 or network operator 10 is a rectangle facing the front, whereas image 233 that will be displayed on the outdoor sign board of FIG. 17 is a tilted image. The image provided by the content provider or the advertiser may be titled, as shown in FIG. 18, and then transmitted to the network TV.

The fixed-type image display region and the movable image display region described above may be included in the background image. The background image may, for example, be included in a firmware implementing the menu screen of the network TV, and the position, shape, and size etc., of the image display region can be changed by updating the firmware.

Figure 19:
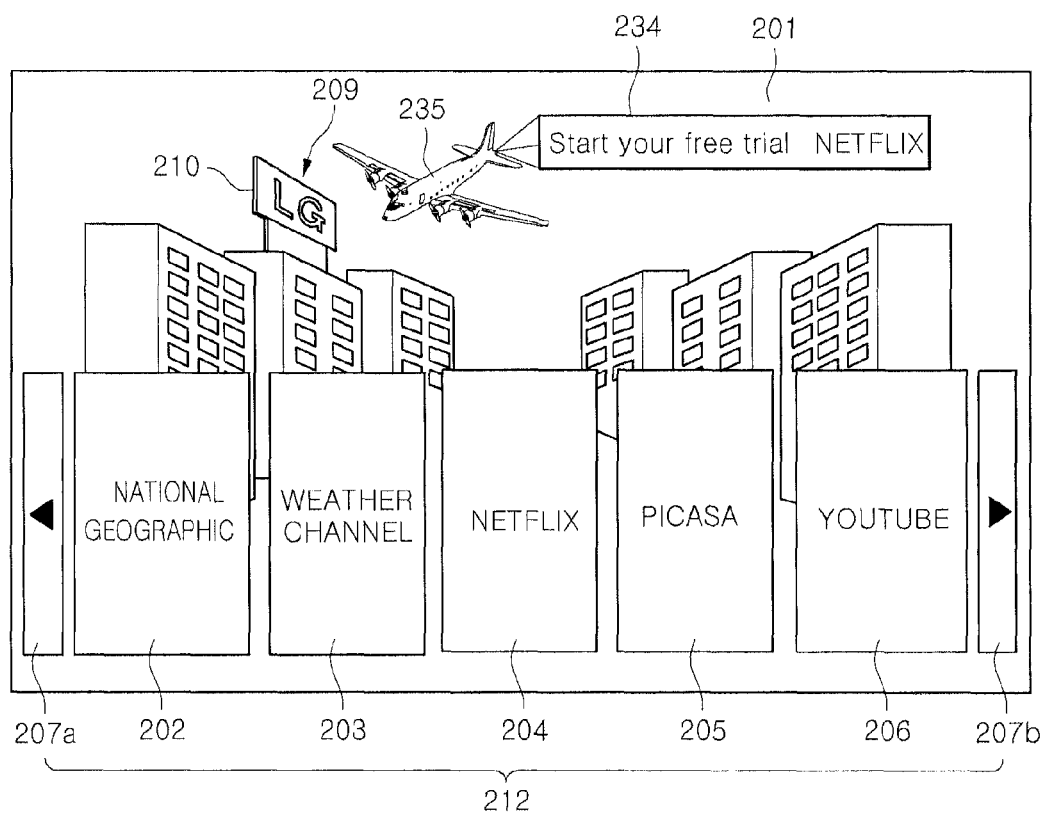

Referring to FIG. 19, according to one embodiment, after a predetermined time passes with the menu screen displayed, it is possible to display a video of an airplane 235 with a banner 234, which is a type of movable image display regions, regardless of whether a user selects an icon. The video of the airplane 235 also relates to the city that is the subject of the background image 201 and displays that the airplane 235 with the banner 234 flies in the sky. Any image or information can be displayed on the banner 234.

When the user selects the airplane 235 or presses a specific button, for example, the ENTER button or a button corresponding thereto while the airplane 235 flies, the detailed information on the message displayed on the image can be displayed, detailed information on the advertisement can be displayed, or the network TV 30 can connect with the advertiser's server.

Figure 20:
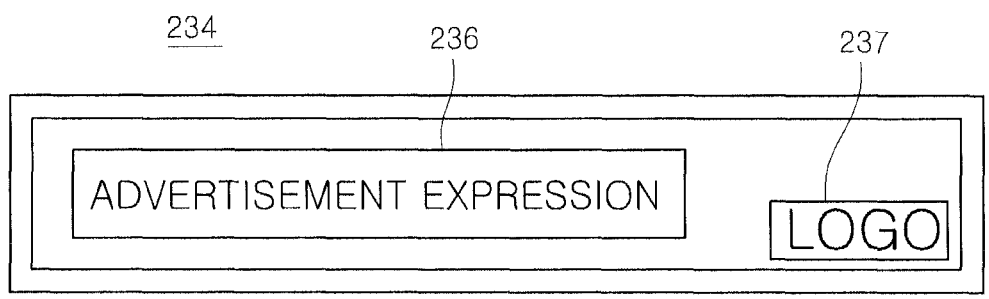

According to one embodiment, as shown in FIG. 20 the banner 234 may include a plurality of lower display regions, that is, an advertisement expression slot 236 and a company logo slot 237. It is possible to implement the image in which the airplane 235 with the banner 234 flies, as shown in FIG. 19, by displaying an advertisement expression and a company logo image provided by the advertiser in the advertisement expression slot 236 and the company logo slot 237. Airplane 235 and the banner 234 may be included in firmware activating the main screen of the network TV, and the position, shape, and size etc., can be changed by updating the firmware of the network TV.

Figure 21:
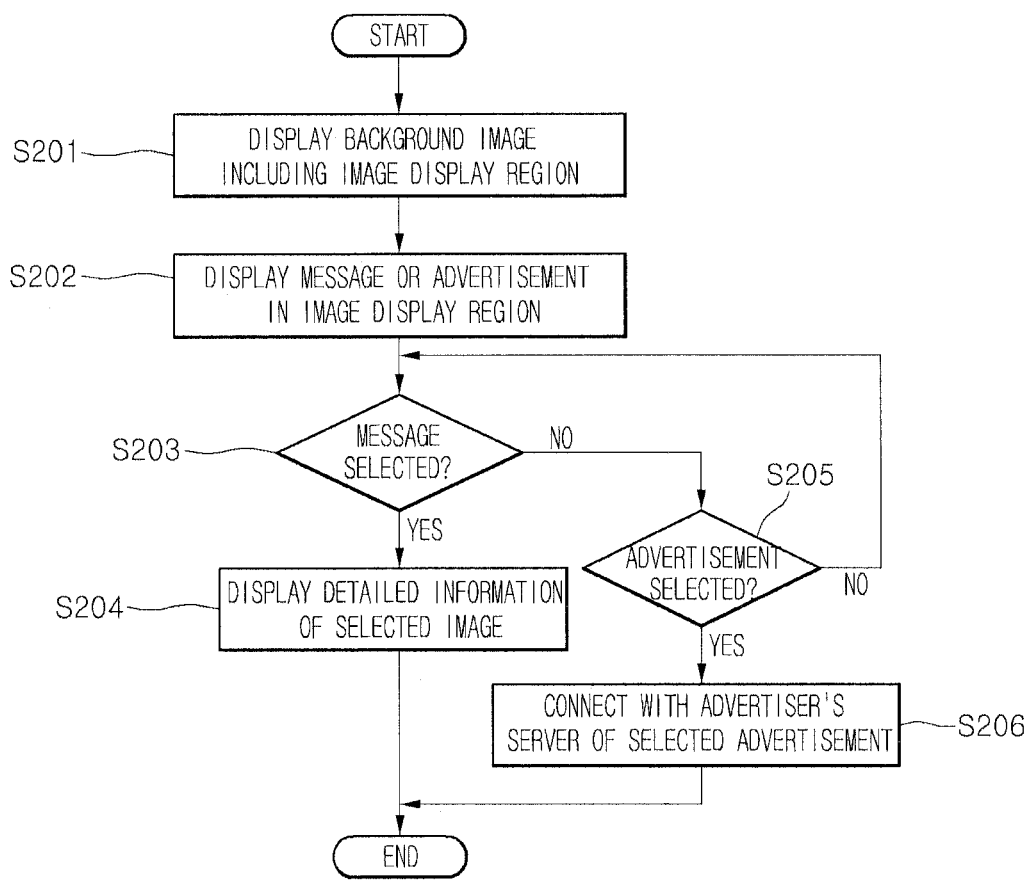
FIG. 21 is a diagram showing operations included in an embodiment of a method for displaying a message or advertisement image in accordance with one or more embodiments described herein.

FIG. 21 shows operations in one embodiment of a method for displaying an image or advertisement on a menu screen in or relative to background image 201.

In step S201, a background image including an image display region where a message or an advertisement image can be displayed is displayed. The message may be a predetermined message for providing a user with information and the advertisement image may include a predetermined image that can be used for an advertisement, such as an advertisement expression and company logo etc.

In step S202, a message or an advertisement image is displayed in the image display region. Steps S201 and S202 may be simultaneously performed. The message or the advertisement may be provided from the network operator or content provider 20 of FIG. 1 or a predetermined advertiser.

In step S203, it is determined whether a user selects the displayed message. When the user selects a message, the detailed information of the selected message is displayed in step S204.

When the user has not selected a message in step S203, it is determined whether to have selected an advertisement in step S205. When the advertisement has been selected, the server of the selected advertiser is connected in step S206. When the advertiser is a contents provider, contents can be provided after the sever of the advertiser is connected.

It stands by when the user does not select any one of the message and the advertisement. According to embodiment, it is possible to automatically change the message or advertisement displayed in the image display region every predetermined time.

According to one embodiment, the menu screen may be composed of a plurality of layers, one layer may displays an image, and it is possible to transmits and display the effect generated by displaying the image to another layer. That is, it is possible to transmit the effect generated by one of the plurality of layers to another layer.

It is possible to provide a user with an active and funny interesting menu screen by making a plurality of layers exchange effects with each other.

In the embodiment shown in FIG. 15, as a video about weather is executed, the background image and icons consecutively exchange effects. That is, as described with reference to FIG. 9, the menu screen can be composed of the layer 213 including the background image 201 and the layer 213' including the icons 212.

When a user selects icon 203 providing weather information, an image in which it snows is first displayed on the layer 213 including the background image 201. It is possible to transmit the effect generated when it snows to the layer including the icons 212. That is, it is possible to display an image 214 that snow is collected on the icons 212 while snow falls in the background image 201. This corresponds to an embodiment that displays an image on one of two different layers and transmits the effect generated by displaying the image to the icons 12 included in another layer.

When a user selects icon 203 providing weather information, the control unit of the network TV first displays an image in which it snows on the layer including the background image 201. Thereafter, the control unit estimates an image in which snows falls and collects on the icons 212 in consideration of the size and position of the icons 212, and performs control for displaying the estimated image.

Figure 22:
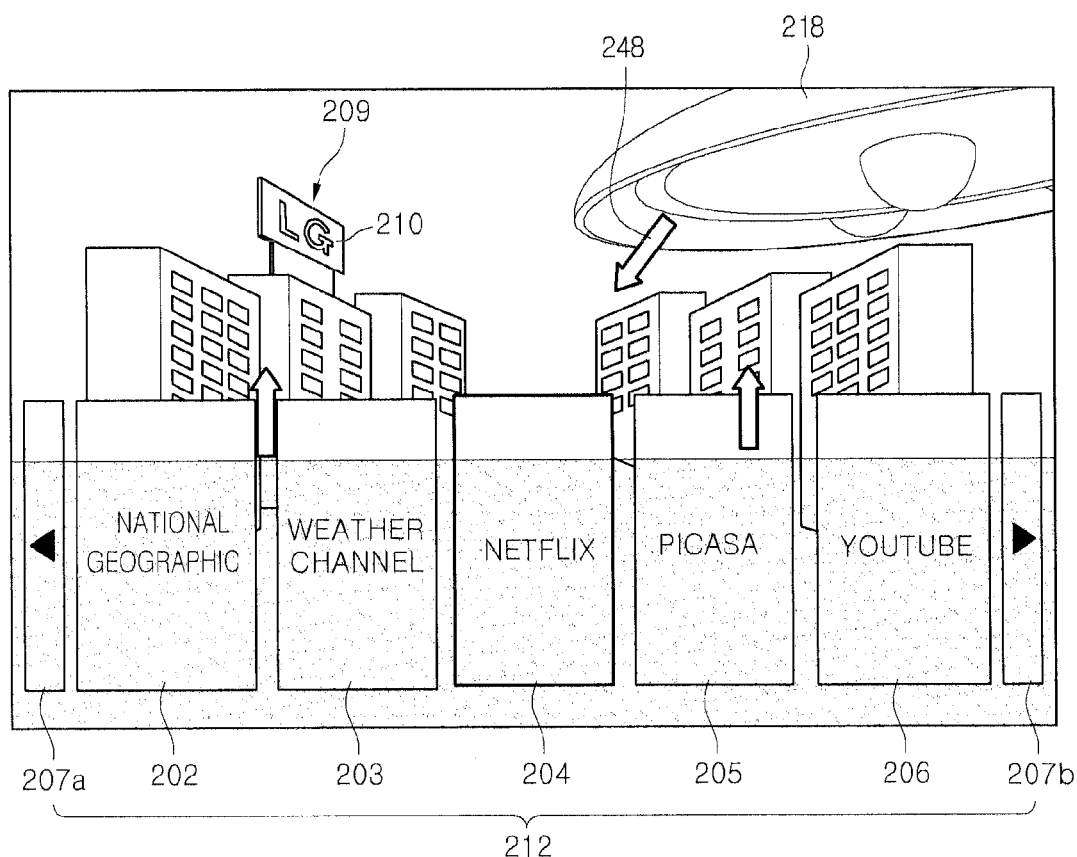
FIGS. 22 and 23 are diagrams showing screens that perform effects performed in accordance with one or more embodiments described herein.
Figure 23:
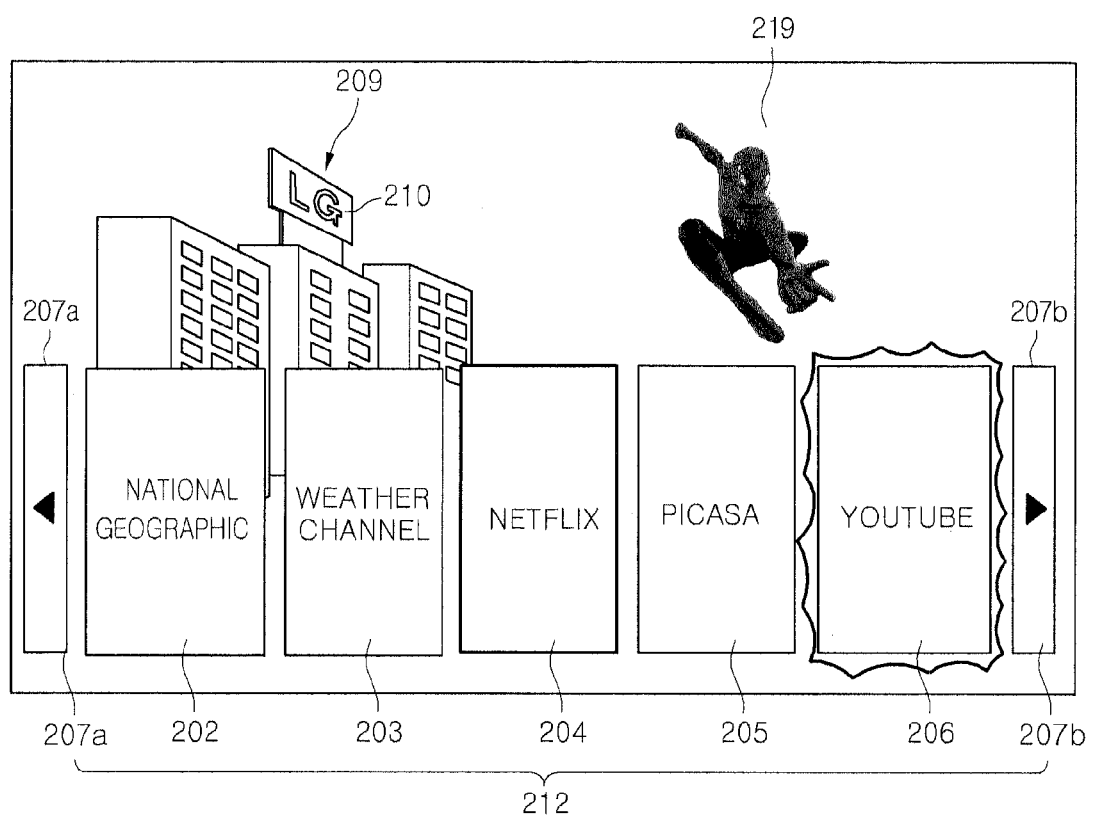

FIGS. 22 and 23 show screens that include effects performed among a plurality of layers. Referring to FIG. 22, when a user selects icon 204 of the content provider providing movie content, an image in which an object in a movie, for example, a large spaceship 218 appears at an upper portion can be displayed. The image of the spaceship can be displayed on the layer including the background image 201. It is possible to gradually darken the screen while the shadow of the spaceship gradually increases in size from the lower end of the background image and also gradually darken icons 212 from the lower end, as the spaceship moves in the direction of an arrow 248. In this configuration, it is possible to display the shadow influencing icons 212 on the layer including the icons 212.

When an image in which the spaceship moves is displayed, the control unit of the network TV estimates a shadow image that will be displayed over icons 212 in consideration of the size and position of the icons and then displays the shadow over the icons 212 on the basis of the estimated result.

Referring to FIG. 23, it is possible to show an image in which a character of a movie, for example, spiderman 219 appears and makes an action hitting one 206 of the icons or shooting webs, when a user selects icon 204 of the contents provider providing movie contents. The image of spiderman 219 is displayed on the layer including the background image. It is possible to display an image in which icon 206 falls forward or webs are entangled by an action of the spiderman. It is possible to display the image in which icon 206 falls or webs are entangled on the layer including the icon.

Figure 24:
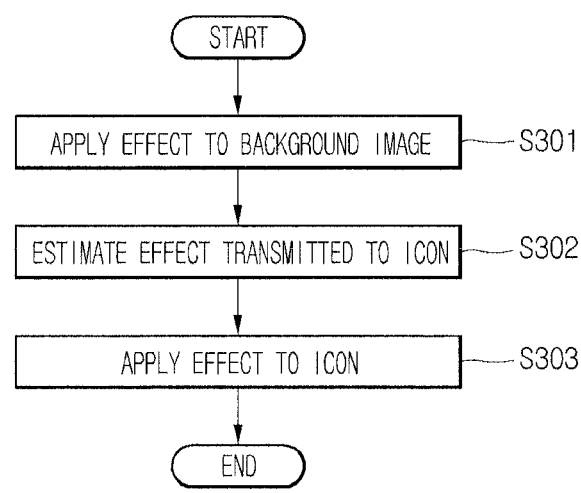
FIG. 24 is a diagram showing operations performed in accordance with an embodiment of a method for performing effects in accordance with one or more embodiments disclosed herein.

FIG. 24 operations included in one embodiment of a method for performing an effect in accordance with image display between layers in a menu screen. In step S301, a effect is applied to a layer including a background image in menu screen.

In step S302, as the effect applied to the background image appears, effects that will be transmitted to the icons or images that will be displayed are estimated, and in step S303, the estimated effects are applied to the icons.

According to one embodiment, it is possible to acquire predetermined condition information of a user or the network TV, for example, information of the area of the user, time, or seasons, and then automatically changed the background image in accordance with the condition information.

Figure 25:
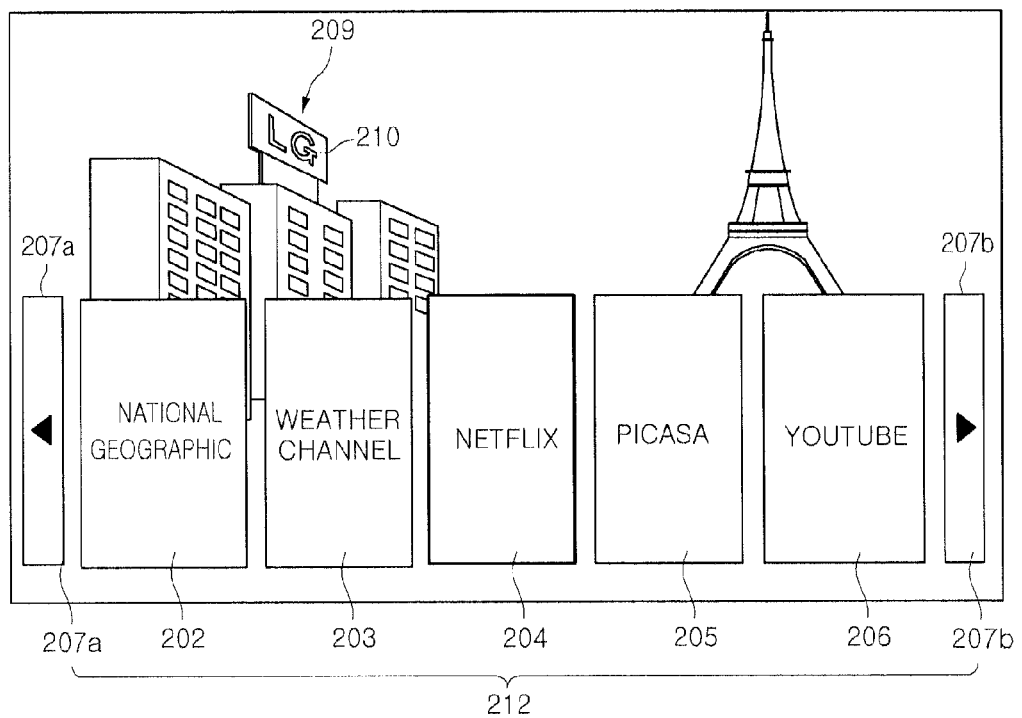
FIGS. 25 to 30 are diagrams showing screens containing background images that change based on condition information of a user or a network TV.
Figure 26:
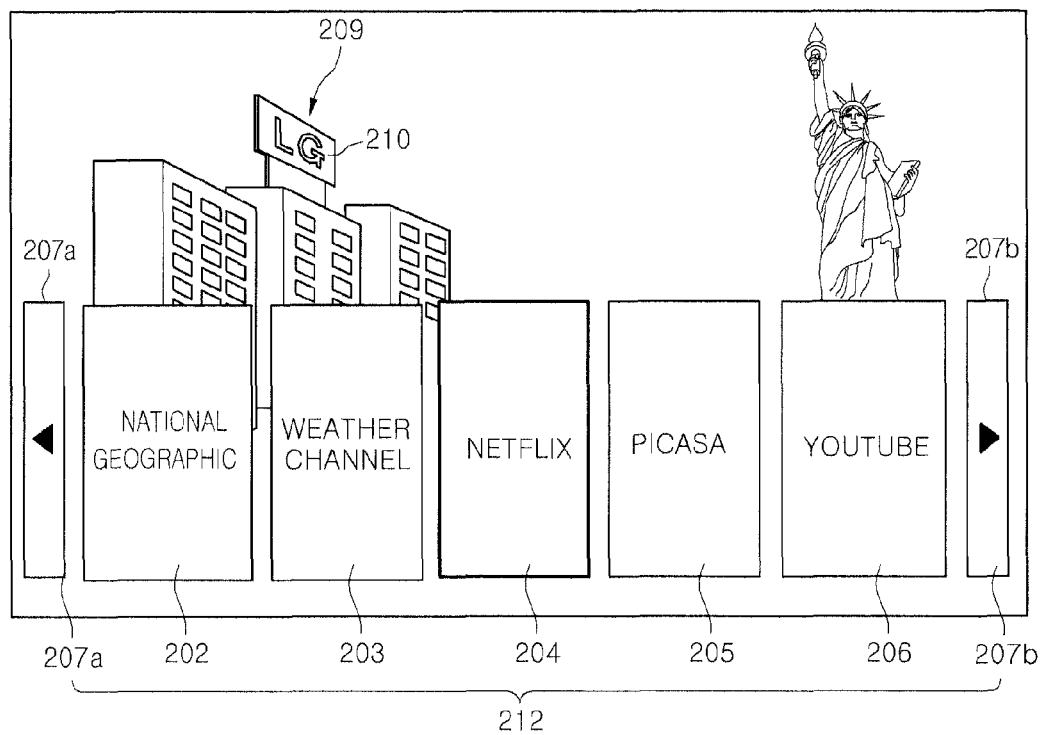

For example, when the area where a user is Paris as shown in FIG. 25, it is possible to display a background image 201 including the Eiffel Tower (which is a landmark of Paris) and when the area is New York it is possible to display a background image including the Statue of Liberty as shown in FIG. 26. The area information of a user can be set by the user, or received from the network operator or the content provider and stored in the network TV. Further, it is possible to change the background image when the area information is changed by a user or when the area is moved out.

Figure 27:
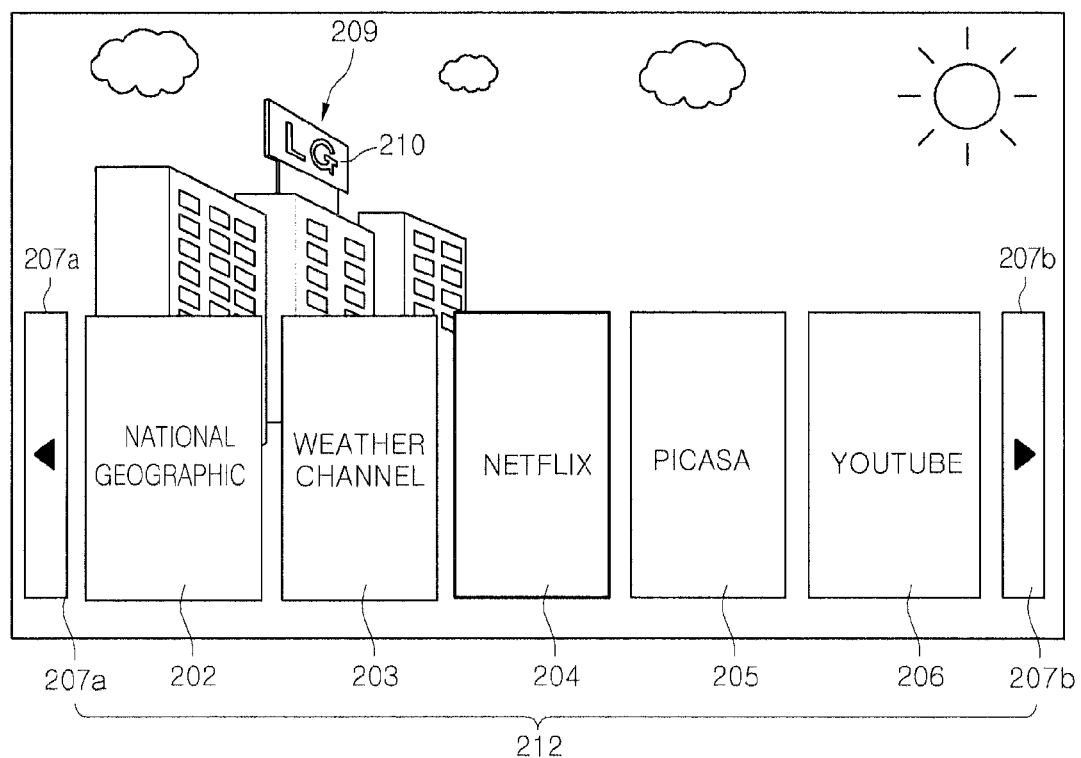
Figure 28:
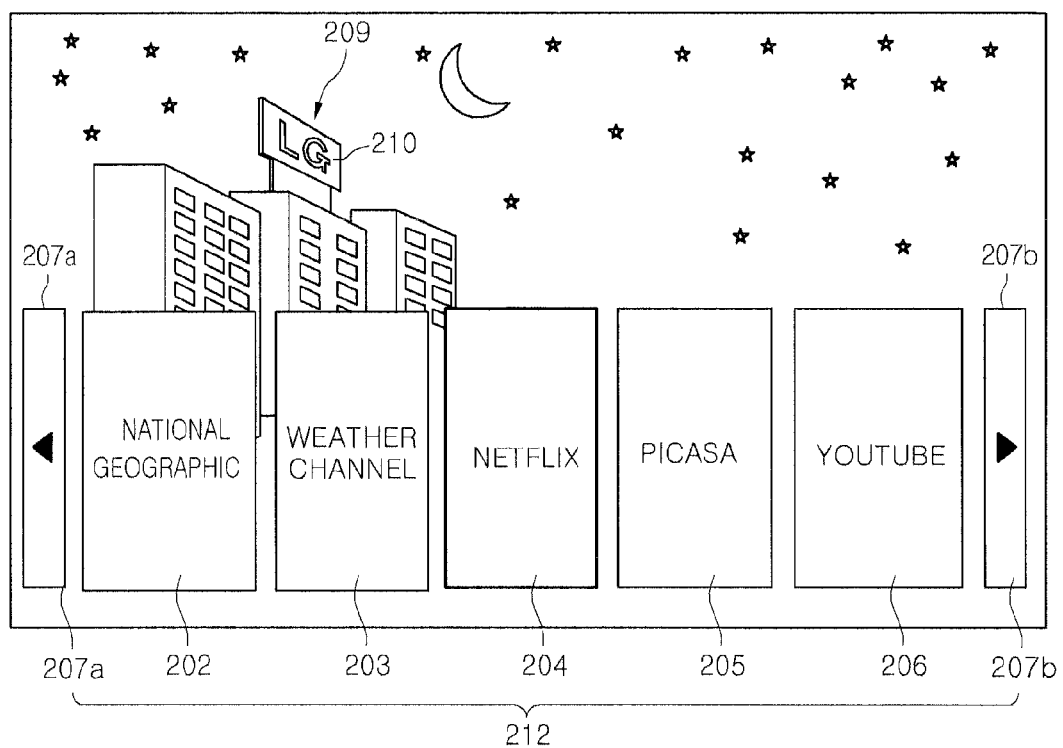

Further, as shown in FIGS. 27 and 28, it is possible to display a background image including a night view or an image including a day view on the basis of the current time information.

Figure 29:
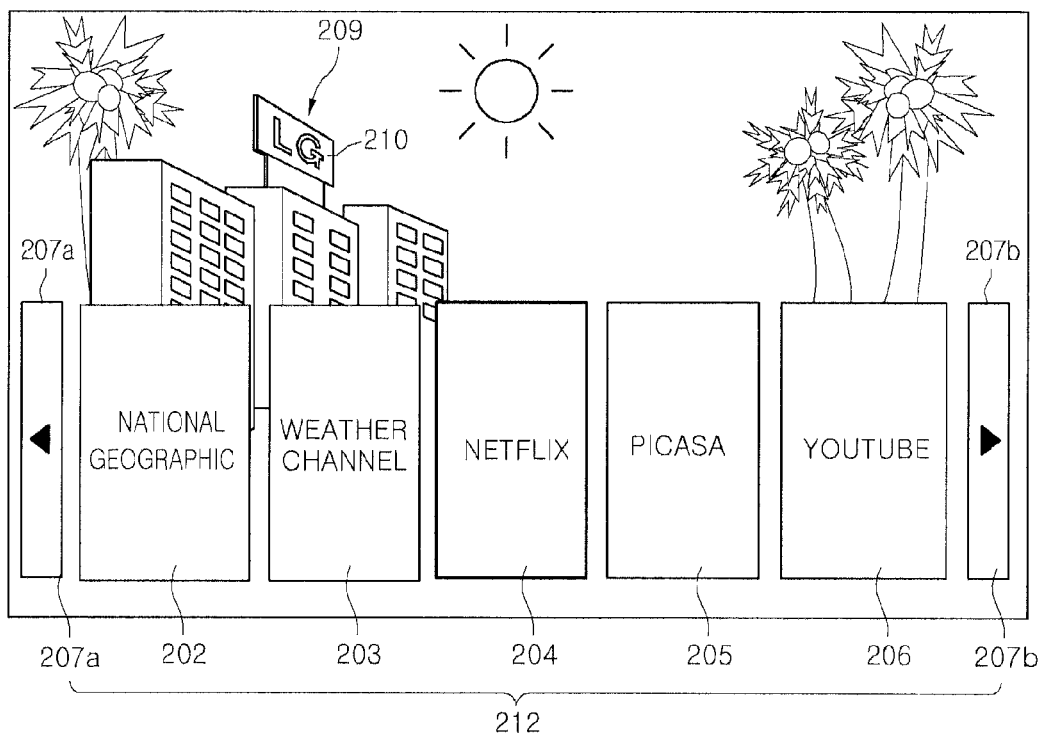
Figure 30:
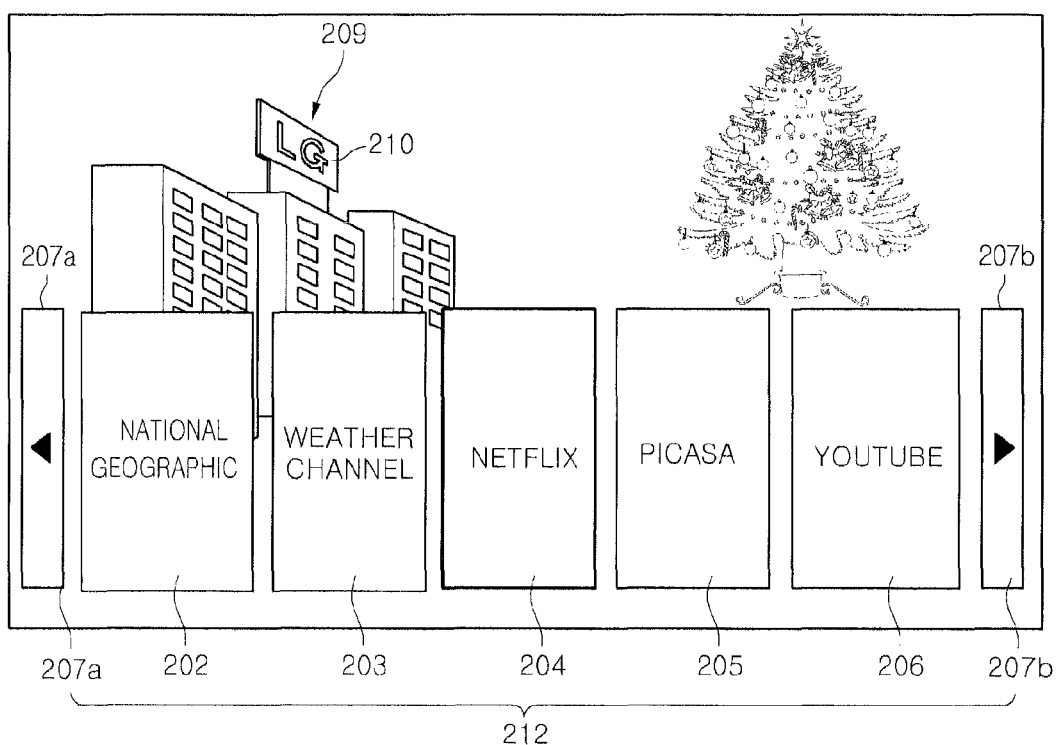

Further, the background image may include an effect or image corresponding to a particular season of the year, when that season currently exists. For example, it is possible to display a background image that includes a summer views in the summer as shown in FIG. 29 and a winter view in the winter as shown in FIG. 30.

The time or weather information necessary for implementing the aforementioned embodiments may be received, for example, from the network operator and content provider and/or may be extracted from a broadcast signal. In addition, an active menu screen may be displayed by changing the background image in various ways in accordance with condition information of the user or network TV.

Figure 31:
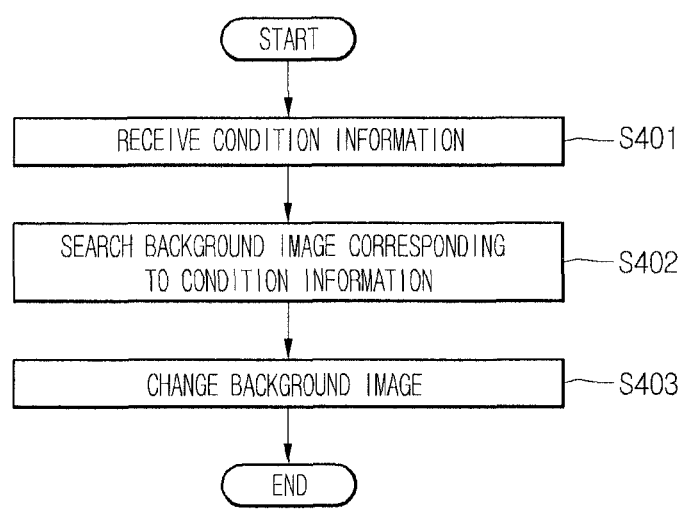
FIG. 31 is a diagram showing operations included an embodiment of a method for changing a background image.

FIG. 31 shows operations included in one embodiment of a method for changing a background image in accordance with condition information from a user or a network TV. In step S401, a network TV receives condition information of a user or the network TV from network operator 10 or content provider 20. The condition information may include area information of a user or time and date (season) information. Also the condition information can be extracted from a broadcast signal that the network TV has received.

In step S402, a background image corresponding to the condition information is searched.

In step S403, the background image is changed into the searched background image. It is possible not to change the background image, when the current displayed environment information consists with the background image. Further, the function may be inactivated, when a user does not want to change the background image.

Further, according to one embodiment, when a problem is detected while monitoring the service condition of each content provider or the network condition of the network TV, it is possible to display information providing notification of or a reason for the problem on the menu screen.

Figure 32:
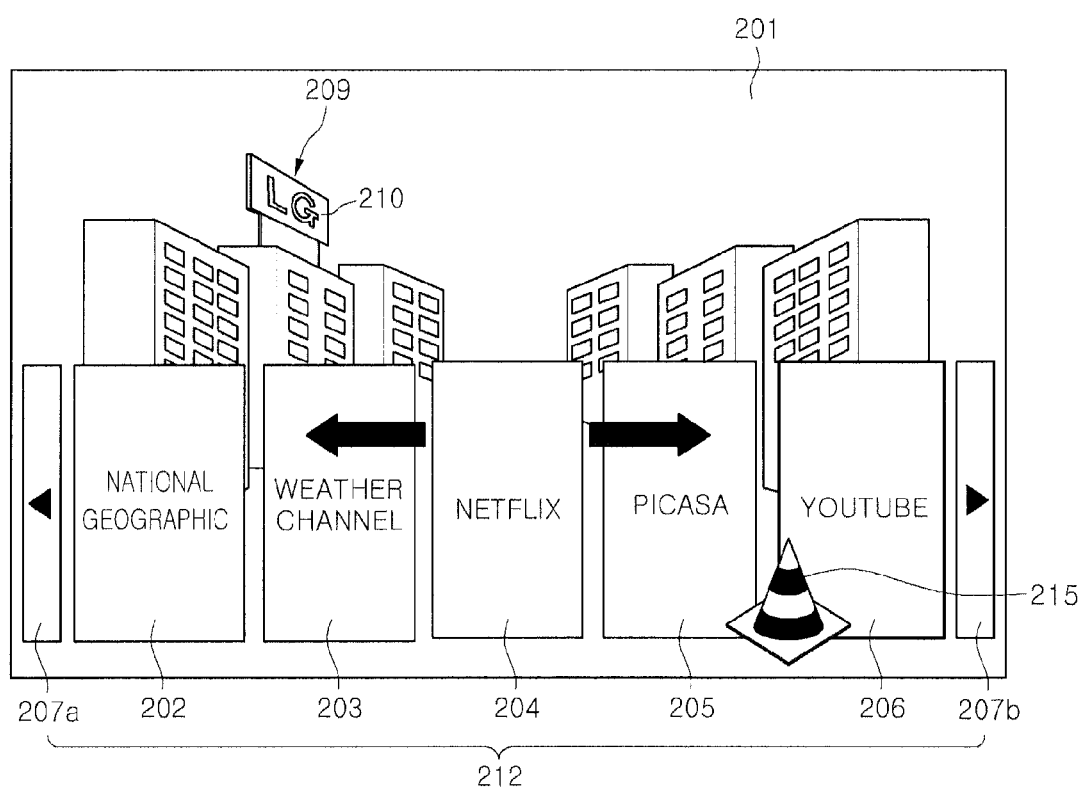
FIGS. 32 to 34 are diagrams showing screens that may be generated for displaying problems encountered in outputting, for example, media information.

When a content provider cannot provide a service due to server check, it is possible to display that service is unavailable on the menu screen. For example, as shown in FIG. 32, it is possible to display that service is unavailable on the corresponding icon 206, in which, preferably, it is possible to display an intuitive image, for example, a graphic image 215, "under construction".

Figure 33:
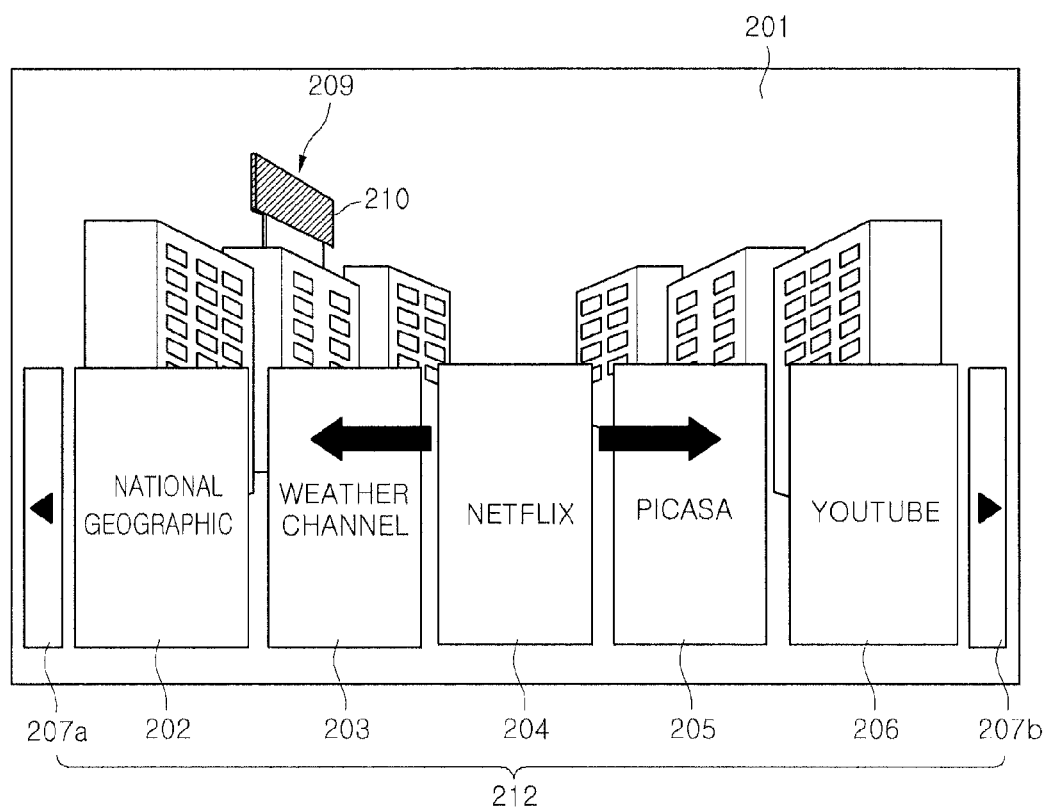

Further, according to one embodiment, it is possible to the connection condition between the network TV and the content provider 20 or the network operator 10 on the menu screen. For example, as shown in FIG. 33, with the Netcast mode executed, it is possible to the brightness of the advertisement image 210 displayed in the image display region 209 included in the background image 201, in accordance with the network connection condition. That is, it is possible to brighten the advertisement image 210 when the network connection condition is good, and it is possible to darken the advertisement image 210 when the connection condition is bad.

The above configuration can provide a user with interest, as compared with displaying the network condition by using a common text or graph etc.

Figure 34:
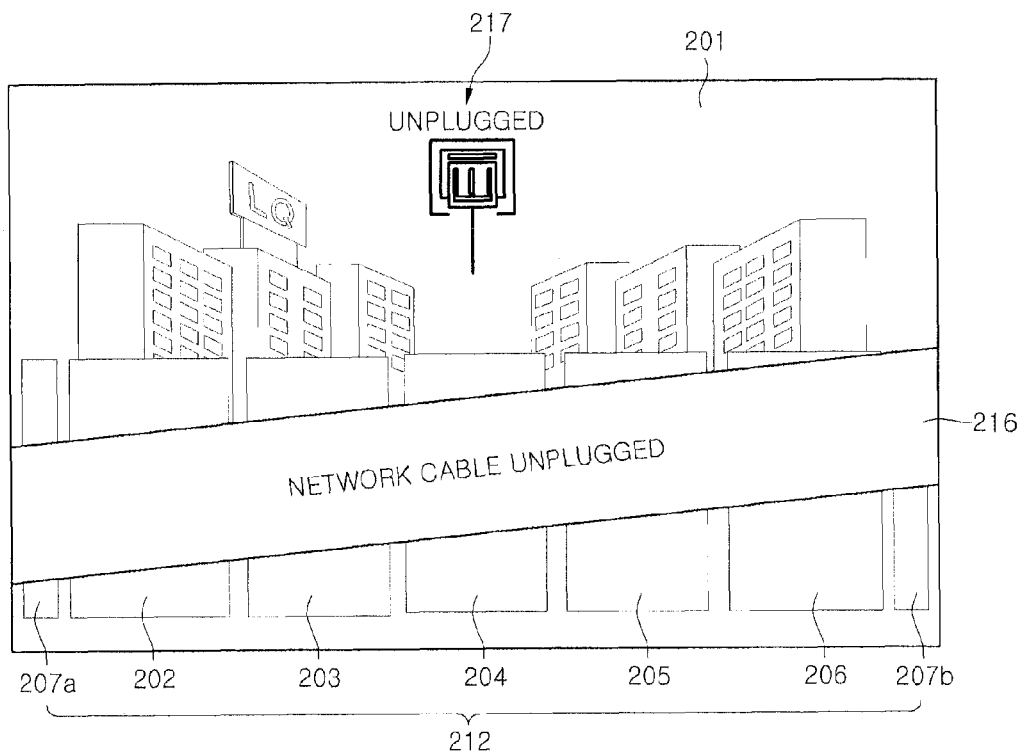

Further, according to one embodiment, when a user executes the Netcast mode and the network cable of the network TV is unplugged and the interface is not operated as shown in FIG. 34, it is possible to display this condition throughout the menu screen. In this case, it is possible to display a menu screen that is more intuitive and provides a user with interest as compared with informing it with a common text, by displaying a predetermined graphic image 217 showing that the cable is unplugged, such as a block tape 216 in general construction sites as shown in FIG. 34.

In this case, because the Netcast service is completely unavailable, it is possible for a user to intuitively be informed of this problem by translucently or dimly displaying the images on the menu screen, that is, the background image 201 and/or the icons 212, except for expressions 216 and 217 informing that the network interface is not operated.

Figure 35:
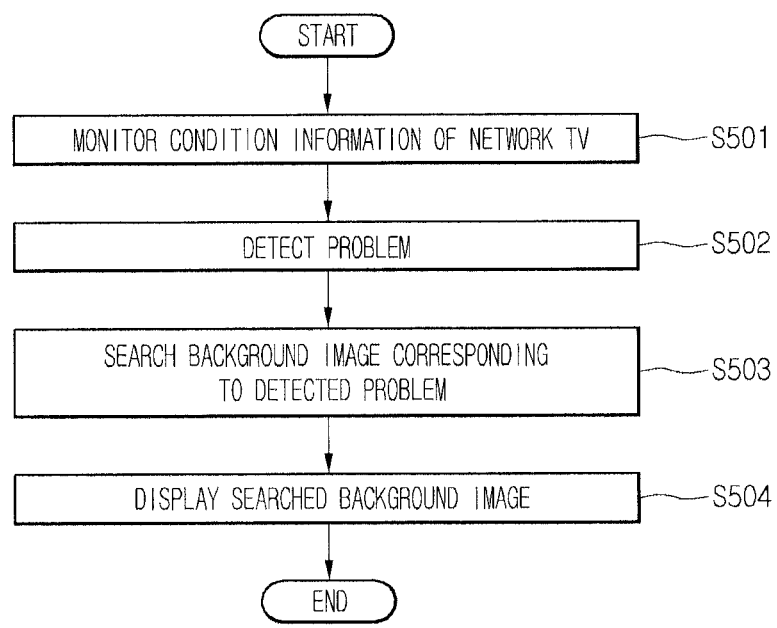
FIG. 35 is a diagram showing operations included in one embodiment of a method of displaying problems on a menu screen.

FIG. 35 shows operations included in one embodiment of a method for changing a menu screen in accordance with a condition of a contents provider or a network TV. The condition information of the network TV is monitored in step S501 and a problem is detected in step S502. A background image corresponding to the detected problem is searched in step S503 and the image corresponding to the detected problem is displayed in step S504.

Figure 36:
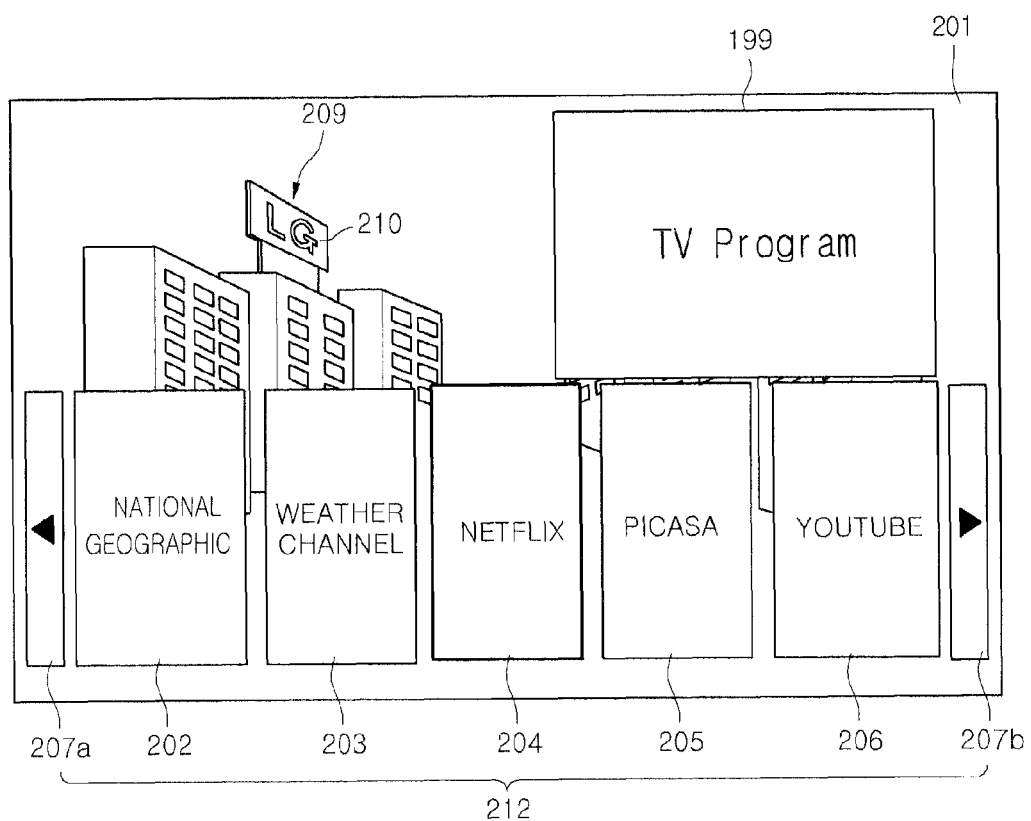
FIG. 36 is a diagram showing another embodiment of a menu screen that is displayed at a same time a television signal is displayed.

In accordance with another embodiment shown in FIG. 36, a television signal containing a television program 199 may be displayed at the same time the menu screen containing the background image and content provider icons is displayed. The television program 199 may be displayed at a fixed or adjustable region in the background image or at another location within the menu screen or at an area outside of the menu screen, for example, in a picture-in-picture signal area of the television screen.

The embodiments described herein may be implemented by a program that is executed by a common processor, such as a computer, and may be implemented by using particularly a flash application or a 3D-flash application. The implemented program can be stored in a recording medium in the network TV which a computer can read. Examples of the computer-readable recording media include a ROM, a RAM, a CD-ROM, a magnetic tape, a floppy disk, an optical data storage etc., and in addition, include a recording medium implemented in the form of a carrier wave (for example, transmission through the Internet).

Further, the computer-readable recording media are distributed on computer systems connected through the network, and thus the computer-readable recording media may be stored and executed as the computer-readable code by a distribution scheme. Further, functional programs, codes, and code segments for implementing a method of receiving broadcast can be easily inferred by programmers in the related art.

Other than the embodiments described above, there may be contents providers who provide various types of contents in a network TV, and the images relating to contents that are displayed everytime the icons of the contents providers are selected can be changed in accordance with embodiments.

One object of the present embodiments is to provide a method of displaying a new type of menu for accessing content in a network TV system.

Another object is to provide a method of more effectively transmitting messages or advertisement to a user in a network TV system.

A display device that is connectable with a network according to an embodiment includes: a network interface unit that connects with at least one contents provider server through the network and receives contents; a user interface unit that receives a user's input that selects one of icons representing the contents provider; a control unit that control an image to be outputted which is controllable by a contents provider corresponding to the selected icon; and a display unit that displays at least one icon representing the contents provider and the image which is controllable by the contents provider.

A method of providing a user interface of a display device connectable with a network in accordance with an embodiment includes: displaying at least one icon that represents a contents provider; receiving one selection of the icons; and displaying an image which is controllable by the contents provider corresponding to the selected icons. According to one embodiment, it is possible to provide a user with a new type of method of displaying and selecting a menu in a network TV system. According to another embodiment, it is possible to provide the method of effectively transmitting the message or advertisement in the network TV system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments, it should be understood that numerous other modifications and/or combinations of the embodiments described herein can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An information manager, comprising:
   a network interface to establish a connection with at least one content provider server through a network;
   a user interface to receive an input signal selecting an icon corresponding to a content provider; and
   a controller configured to
   control for displaying a menu screen that is implemented by overlapping a first layer including a background image with a second layer including one or more icons corresponding to one or more content providers,
   control for displaying an image corresponding to the selected icon overlapped on the first layer and on the second layer,
   wherein the selected icon is one of the one or more icons corresponding to content providers,
   wherein the image is based on information received through the network interface from the selected content provider, and
   estimate an effect in accordance with the image that will be transmitted from the first layer to the second layer,
   wherein the image displayed on the first layer relates to the background image and includes a first animation corresponding to the estimated effect, and the image displayed on the second layer relates to the one or more icons and includes a second animation corresponding to the estimated effect, wherein the first animation and the second animation are related to subject matter of the selected content provider and the second animation is coordinated with the first animation corresponding to the estimated effect.

2. The information manager of claim 1, wherein software for controlling display of information relating to the content provider of the selected icon is received from a network operator.

3. The information manager of claim 1, wherein at least one of the selected icon or the image is output as a three-dimensional representation.

4. The information manager of claim 1, further comprising:
   a broadcast signal processor to receive and process a broadcast signal for output on a display device.

5. The information manager of claim 1, wherein the controller is configured to control for outputting information corresponding to the selected icon for display, wherein the information corresponds to movie contents provided by the content provider, and wherein the image includes at least one of characters or objects corresponding to the movie contents.

6. The information manager of claim 1, wherein the controller is further configured to control for outputting information corresponding to the selected icon for display, wherein the information includes weather information provided by the content provider, and wherein the image corresponds to the weather information.

7. The information manager of claim 6, wherein when the image corresponding to the weather information is displayed on the first layer, the second layer receives and displays a visual effect or an audible effect is generated in response to the display of the image on the first layer.

8. The information manager of claim 1, wherein the background image is changed based on a user setting or a predetermined condition information.

9. The information manager of claim 1, wherein the controller controls display of the background image on the first layer that corresponds to the selected icon, and wherein the background image includes a landmark of where a user is located.

10. The information manager of claim 1, wherein the background image is changed based on time or a season of the year.

11. A method for managing information, comprising:
    displaying a menu screen that is implemented by overlapping a first layer including a background image with a second layer including a plurality of icons which correspond to a respective plurality of content providers;
    receiving a signal selecting one of the plurality of icons;
    estimating an effect in accordance with an image that will be transmitted from the first layer to the second layer, wherein the image is based on information received from the selected content provider of the selected icon; and
    displaying an image corresponding to the selected icon overlapped on the first layer and on the second layer, wherein the image displayed on the first layer relates to the background image and includes a first animation corresponding to the estimated effect, and the image displayed on the second layer relates to the one or more icons and includes a second animation corresponding to the estimated effect, wherein the first animation and the second animation are related to subject matter of the selected content provider and the second animation is coordinated with the first animation corresponding to the estimated effect.

12. The method of claim 11, further comprising:
    connecting to a server of the content provider of the selected icon in response to a user's input.

13. The method of claim 11, wherein the at least one of selected icon or the image is output as a three-dimensional representation.

14. The method of claim 11, wherein the content provider of the selected icon provides national science contents and wherein the image is an animation that includes at least one or more animal images.

15. The method of claim 11, wherein the content provider of the selected icon provides movie contents and wherein the image includes at least one of characters or objects corresponding to the movie.

16. The method of claim 11, wherein the content provider of the selected icon provides weather information and wherein the image is a video that is outputted based on weather information.

17. The method of claim 16, further comprising:
displaying the image corresponding to the weather information on the first layer; and
activating an audio or visual effect on the second layer, wherein the audio or visual effect is generated by displaying the image on the first layer.

18. The method of claim 11, further comprising:
receiving condition information from content provider or network operator, wherein the condition information includes at least one of location information of a user, time information or date information;
searching the background image corresponding to the received condition information; and
changing the background image on the first layer into the searched background image.

19. The method of claim 11, further comprising:
displaying one or more different landmarks based on area information of the user.

20. The method of claim 11, further comprising:
changing the background image in accordance with a change in time or seasons.

\* \* \* \* \*